US009025836B2

(12) United States Patent
Ptucha

(10) Patent No.: US 9,025,836 B2
(45) Date of Patent: May 5, 2015

(54) IMAGE RECOMPOSITION FROM FACE DETECTION AND FACIAL FEATURES

(75) Inventor: Raymond William Ptucha, Honeoye Falls, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 34 days.

(21) Appl. No.: 13/284,633

(22) Filed: Oct. 28, 2011

(65) Prior Publication Data
US 2013/0108122 A1 May 2, 2013

(51) Int. Cl.
G06K 9/00 (2006.01)
G06T 11/00 (2006.01)
H04N 5/235 (2006.01)

(52) U.S. Cl.
CPC ............ G06T 11/00 (2013.01); *G06T 2210/22* (2013.01); H04N 5/2355 (2013.01)

(58) Field of Classification Search
CPC ............... G06K 9/46; G06K 9/00228; G06K 2009/00221; G06T 3/40; G06T 2210/22; G06T 2207/30201
USPC ............ 382/118, 195, 173, 282; 358/53, 448
See application file for complete search history.

(56) References Cited

U.S. PATENT DOCUMENTS

| | | | |
|---|---|---|---|
| 6,282,317 B1 | 8/2001 | Luo et al. | |
| 6,314,209 B1 | 11/2001 | Kweon et al. | |
| 6,545,743 B1 | 4/2003 | Luo et al. | |
| 6,654,506 B1 | 11/2003 | Luo et al. | |
| 6,654,507 B2 | 11/2003 | Luo | |
| 6,940,545 B1 | 9/2005 | Ray et al. | |
| 7,171,058 B2 | 1/2007 | Luo | |
| 7,317,815 B2 | 1/2008 | Steinberg et al. | |
| 7,616,233 B2 * | 11/2009 | Steinberg et al. | 348/222.1 |
| 7,640,516 B2 | 12/2009 | Atkins | |
| 8,169,646 B2 * | 5/2012 | Sasaki | 358/1.15 |
| 8,488,023 B2 | 7/2013 | Bacivarov et al. | |
| 2002/0191861 A1 * | 12/2002 | Cheatle | 382/282 |
| 2004/0042644 A1 | 3/2004 | Yuasa et al. | |
| 2005/0147292 A1 | 7/2005 | Huang et al. | |
| 2005/0220345 A1 * | 10/2005 | Chiu et al. | 382/190 |
| 2005/0225566 A1 | 10/2005 | Kojo | |
| 2006/0072847 A1 * | 4/2006 | Chor et al. | 382/282 |
| 2006/0115185 A1 * | 6/2006 | Iida et al. | 382/305 |
| 2006/0140445 A1 | 6/2006 | Cusack, Jr. | |
| 2007/0024908 A1 * | 2/2007 | Hanechak | 358/1.18 |
| 2007/0113248 A1 | 5/2007 | Hwang et al. | |

(Continued)

FOREIGN PATENT DOCUMENTS

WO WO-2010/073615 7/2010

OTHER PUBLICATIONS

Mingju Zhang, Lei Zhang, Yanfeng Sun, Lin Feng, Weiying Ma, "Auto Cropping for Digital Photographs", IEEE international conference on multimedia and Expo, Jul. 6, 2005, pp. 438-441.*

(Continued)

*Primary Examiner* — Stephen R Koziol
*Assistant Examiner* — Shaghayegh Azima

(57) ABSTRACT

A computing system for automatically identifying individual regions in a digital image that include a human face, forming combined padded regions and automatically evaluating each of the regions including calculating a fitness score for each of the combined padded regions and ignoring at least one of the combined padded regions whose fitness score is below a known threshold.

29 Claims, 20 Drawing Sheets

(56) References Cited

U.S. PATENT DOCUMENTS

| | | | |
|---|---|---|---|
| 2007/0183663 A1* | 8/2007 | Wang et al. | 382/173 |
| 2007/0217676 A1 | 9/2007 | Grauman et al. | |
| 2007/0236762 A1* | 10/2007 | Tsuji | 358/537 |
| 2007/0268394 A1 | 11/2007 | Nonaka et al. | |
| 2008/0025558 A1 | 1/2008 | Nozawa | |
| 2008/0075388 A1* | 3/2008 | Nishijima | 382/282 |
| 2008/0181512 A1* | 7/2008 | Gavin et al. | 382/209 |
| 2008/0187187 A1 | 8/2008 | Tezuka | |
| 2008/0205866 A1 | 8/2008 | Sakamoto | |
| 2008/0253690 A1 | 10/2008 | Askelof et al. | |
| 2008/0304718 A1* | 12/2008 | Ryuto et al. | 382/118 |
| 2009/0003709 A1 | 1/2009 | Kaneda et al. | |
| 2009/0021576 A1 | 1/2009 | Linder et al. | |
| 2009/0052746 A1 | 2/2009 | Aoki et al. | |
| 2009/0052783 A1* | 2/2009 | Aoki et al. | 382/209 |
| 2009/0059030 A1 | 3/2009 | Hoshii | |
| 2009/0060344 A1 | 3/2009 | Yamazaki et al. | |
| 2009/0116705 A1 | 5/2009 | Suzuki et al. | |
| 2009/0147107 A1 | 6/2009 | Kawahara et al. | |
| 2009/0147297 A1 | 6/2009 | Stevenson | |
| 2009/0185744 A1* | 7/2009 | Sanno et al. | 382/173 |
| 2009/0238419 A1 | 9/2009 | Steinberg et al. | |
| 2009/0284608 A1 | 11/2009 | Hong et al. | |
| 2009/0303342 A1 | 12/2009 | Corcoran et al. | |
| 2009/0309702 A1 | 12/2009 | Hirai | |
| 2010/0008549 A1 | 1/2010 | Jessen et al. | |
| 2010/0046841 A1* | 2/2010 | Yamazaki et al. | 382/203 |
| 2010/0070876 A1* | 3/2010 | Jain et al. | 715/748 |
| 2010/0073506 A1 | 3/2010 | Uehara et al. | |
| 2010/0104134 A1 | 4/2010 | Wang et al. | |
| 2010/0110266 A1* | 5/2010 | Lee et al. | 348/333.02 |
| 2010/0119174 A1* | 5/2010 | Shingai | 382/275 |
| 2010/0128986 A1 | 5/2010 | Xu | |
| 2010/0158325 A1 | 6/2010 | Piramuthu et al. | |
| 2010/0189355 A1 | 7/2010 | Tanaka et al. | |
| 2010/0225669 A1 | 9/2010 | Park | |
| 2010/0226584 A1* | 9/2010 | Weng et al. | 382/225 |
| 2010/0245532 A1* | 9/2010 | Kurtz et al. | 348/14.03 |
| 2010/0271499 A1 | 10/2010 | Steinberg et al. | |
| 2010/0272365 A1 | 10/2010 | Yamamoto et al. | |
| 2010/0293185 A1* | 11/2010 | Rosado et al. | 707/769 |
| 2010/0299627 A1 | 11/2010 | Kenagy | |
| 2011/0025709 A1 | 2/2011 | Ptucha et al. | |
| 2011/0026780 A1 | 2/2011 | Corcoran et al. | |
| 2011/0069085 A1* | 3/2011 | Weber et al. | 345/620 |
| 2011/0069879 A1 | 3/2011 | Hwang et al. | |
| 2011/0096228 A1 | 4/2011 | Deigmoeller et al. | |
| 2011/0143728 A1 | 6/2011 | Holopainen et al. | |
| 2011/0164816 A1 | 7/2011 | Guo | |
| 2011/0164828 A1* | 7/2011 | Iwata | 382/274 |
| 2011/0170770 A1 | 7/2011 | Remedios | |
| 2011/0222782 A1 | 9/2011 | Kashiwagi | |
| 2011/0249961 A1 | 10/2011 | Brunner | |
| 2011/0304747 A1* | 12/2011 | Nakata et al. | 348/231.99 |
| 2012/0092516 A1 | 4/2012 | Hata | |
| 2012/0098992 A1* | 4/2012 | Hosoe | 348/222.1 |
| 2012/0140994 A1 | 6/2012 | Yamada | |
| 2012/0148121 A1* | 6/2012 | Ryuto et al. | 382/118 |
| 2012/0189168 A1* | 7/2012 | El-Maleh et al. | 382/107 |
| 2012/0229694 A1 | 9/2012 | Steinberg et al. | |
| 2012/0243729 A1 | 9/2012 | Pasquero | |
| 2012/0259638 A1 | 10/2012 | Kalinli | |
| 2012/0268359 A1 | 10/2012 | Chen et al. | |
| 2012/0321145 A1 | 12/2012 | Saito et al. | |
| 2013/0069883 A1 | 3/2013 | Oga | |
| 2013/0100025 A1 | 4/2013 | Vernacchia | |
| 2013/0108119 A1 | 5/2013 | Ptucha | |
| 2013/0108122 A1 | 5/2013 | Ptucha | |
| 2013/0108168 A1* | 5/2013 | Ptucha | 382/195 |
| 2013/0108169 A1 | 5/2013 | Ptucha | |
| 2013/0108170 A1* | 5/2013 | Ptucha | 382/195 |
| 2013/0108175 A1* | 5/2013 | Ptucha | 382/199 |

OTHER PUBLICATIONS

Banerjee, S., et al, "In-Camera Automation of Photographic Composition Rules," IEEE Transactions on Image Processing, vol. 16, No. 7, Jul. 1, 2007, pp. 1807-1820.

Burghardt, T., et al., "Analysing Animal Behavior in Wildlife Videos Using Face Detection and Tracking," IEEE Proc, Vision, Image and Signal Processing, vol. 153, No. 3, Jun. 2006, pp. 305-312.

Cootes, T.F. et al., "Active shape models—their training and application," Computer Vision and Image Understanding, vol. 61, No. 1, Jan. 1995, pp. 38-59.

Dementhon, Daniel F et al., "Model Based Pose in 25 Lines of Code", Proceedings from the Image Understanding Workshop, 1992, 30 pages.

Gallagher, A., et al., "Clothing Cosegmentation for Recognizing People," IEEE Conference on Computer Vision and Pattern Recognition, 2008, 8 pages.

Gallagher, A., et al., "Using Context to Recognize People in Consumer Images", IPSJ Transaction on Computer Vision and Applications, 2009, 12 pages.

International Search Report and Written Opinion for PCT/US2012/059687, mailed Jan. 8, 2013.

Mingju Zhang et al., "Auto Cropping for Digital Photographs," IEEE International Conference on Multimedia and Expo, 2005, Jul. 6, 2005, pp. 438-441.

R.W. Ptucha and A. Savakis, "Facial Pose Estimation Using a Symmetrical Feature Model", Proceedings of ICME Workshop on Media Information Analysis for Personal and Social Applications, 2009, pp. 1664-1667.

Ramanan, D., "Finding and Tracking People from the Bottom Up," IEEE Computer Society Conference on CVPR 2003, 8 pages.

Schneiderman, H., "Feature-centric evaluation for efficient cascaded object detection," Computer Vision and Pattern Recognition, 2004, Proceedings of the 2004 IEEE Computer Society Conference, vol. 2, pp. II-29-II-36.

Shotton, Jamie, et al., "Real-Time Human Pose Recognition in Parts from Single Depth Images," CVPR 2011, pp. 1297-1304.

Snavely, Noah et al., "Finding Paths Through the World's Photos," SIGGRAPH 2008, 11 pages.

Viola, P and Jones, M., "Rapid object detection using a boosted cascade of simple features," in Computer Vision and Pattern Recognition, 2001, Proceedings of the 2001 IEEE Computer Society Conference 2001, vol. 1, pp. I-511-I-518.

Das, M et al., "Automatic face-based image grouping for albuming," Systems, Man and Cybernetics, 2003, IEEE International Conference on, vol. 4, pp. 3726-3731, Oct. 5, 2003.

Deselaers, Thomas et al., "Pan, Zoom, Scan—Time-Coherent, Trained Automatic Video Cropping," IEEE Publication of the Proceedings of the 2008 IEEE Conference on Computer Vision and Pattern Recognition, Jun. 1, 2008, 8 pages.

Goodman, J.W. Introduction to Fourier Optics, McGraw-Hill San Francisco, 1968, pp. 113-117.

Non-Final Office Action on U.S. Appl. No. 13/284,229, mailed Jun. 25, 2013.

Non-Final Office Action on U.S. Appl. No. 13/284,307, mailed Jul. 3, 2013.

Non-Final Office Action on U.S. Appl. No. 13/284,353 mailed Sep. 4, 2013.

Non-Final Office Action on U.S. Appl. No. 13/284,409 mailed Jul. 9, 2013.

Non-Final Office Action on U.S. Appl. No. 13/284,473, mailed May 31, 2013.

Non-Final Office Action on U.S. Appl. No. 13/284,508, mailed Jun. 28, 2013.

Non-Final Office Action on U.S. Appl. No. 13/284,554, mailed Jul. 10, 2013.

Non-Final Office Action on U.S. Appl. No. 13/284,648, mailed Jun. 12, 2013.

Non-Final Office Action on U.S. Appl. No. 13/284,598, mailed Jul. 3, 2013.

(56) References Cited

OTHER PUBLICATIONS

Veeraraghaven et al., "Dappled Photography: Mask Enhanced Cameras for Heterodyned Light Fields and Coded Aperture Refocusing," ACM Transactions on Graphics 26(3), Jul. 2007, Article 69, 13 pages.
Final Office Action on U.S. Appl. No. 13/284,229, mailed Nov. 4, 2013.
Final Office Action on U.S. Appl. No. 13/284,307, mailed Apr. 23, 2014.
Non-Final Office Action on U.S. Appl. No. 13/284,229, mailed Apr. 28, 2014.
Final Office Action on U.S. Appl. No. 13/284,554, mailed Apr. 9, 2014.
Final Office Action on U.S. Appl. No. 13/284,473, mailed Jan. 17, 2014.
Notice of Allowance on U.S. Appl. No. 13/284,473, mailed Mar. 20, 2014.
International Preliminary Report on Patentability for PCT/US2012/059687, mailed May 8, 2014.
Final Office Action on U.S. Appl. No. 13/284,229, mailed Aug. 29, 2014.
Notice of Allowance on U.S. Appl. No. 13/284,554, mailed Sep. 4, 2014.
Notice of Allowance on U.S. Appl. No. 13/284,229, mailed Dec. 11, 2014.
Notice of Allowance on U.S. Appl. No. 13/284,307, mailed Jan. 8, 2015.

\* cited by examiner

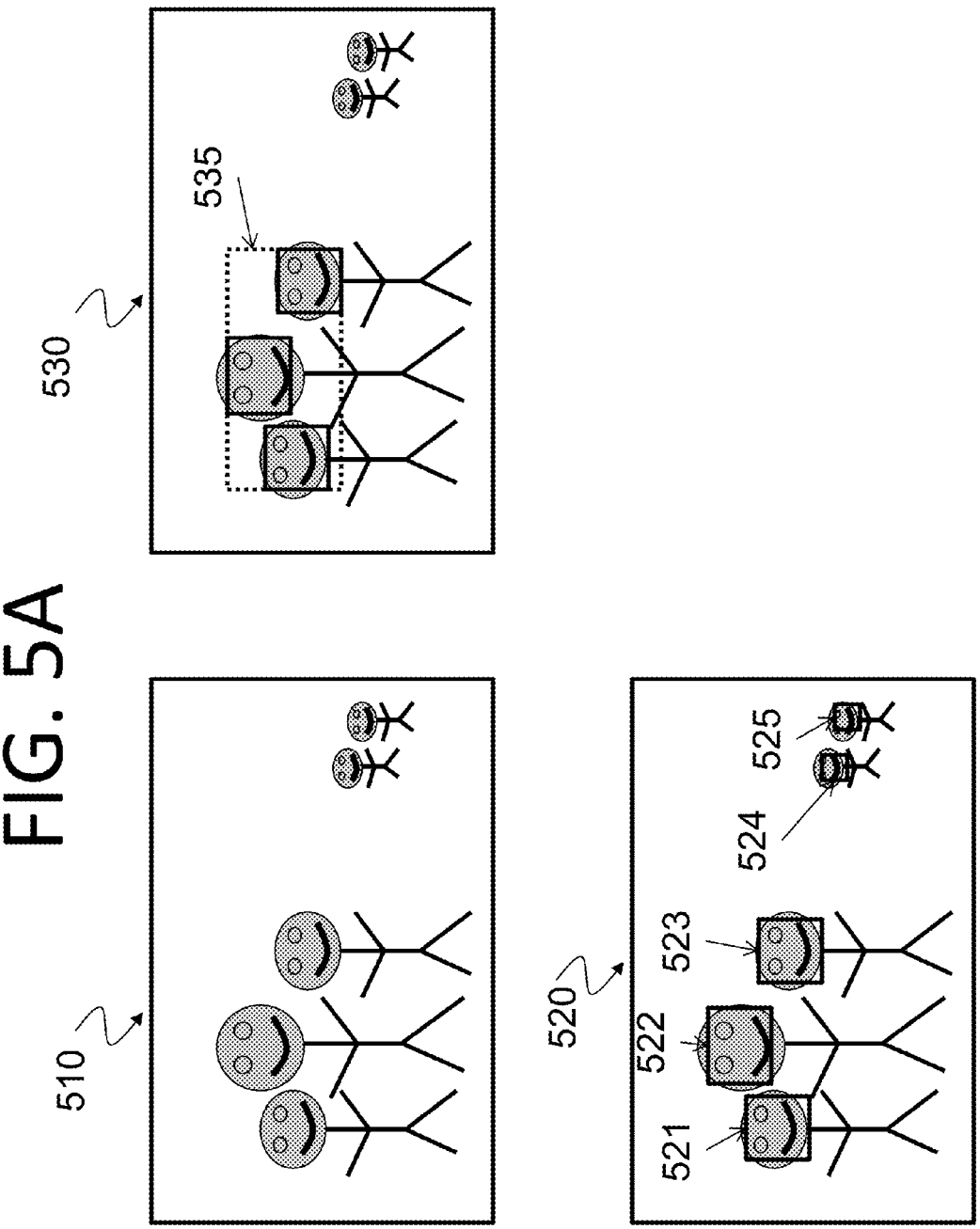

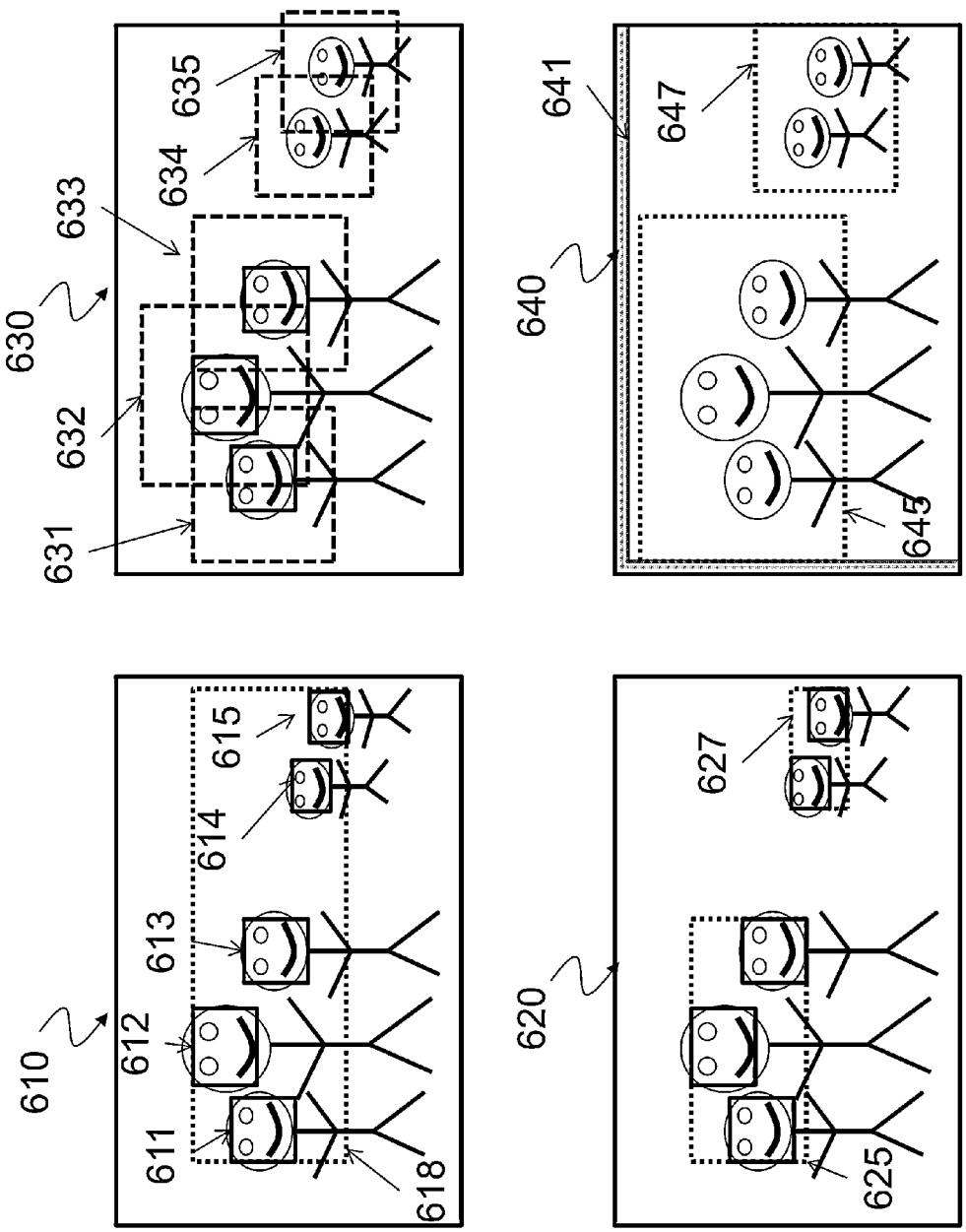

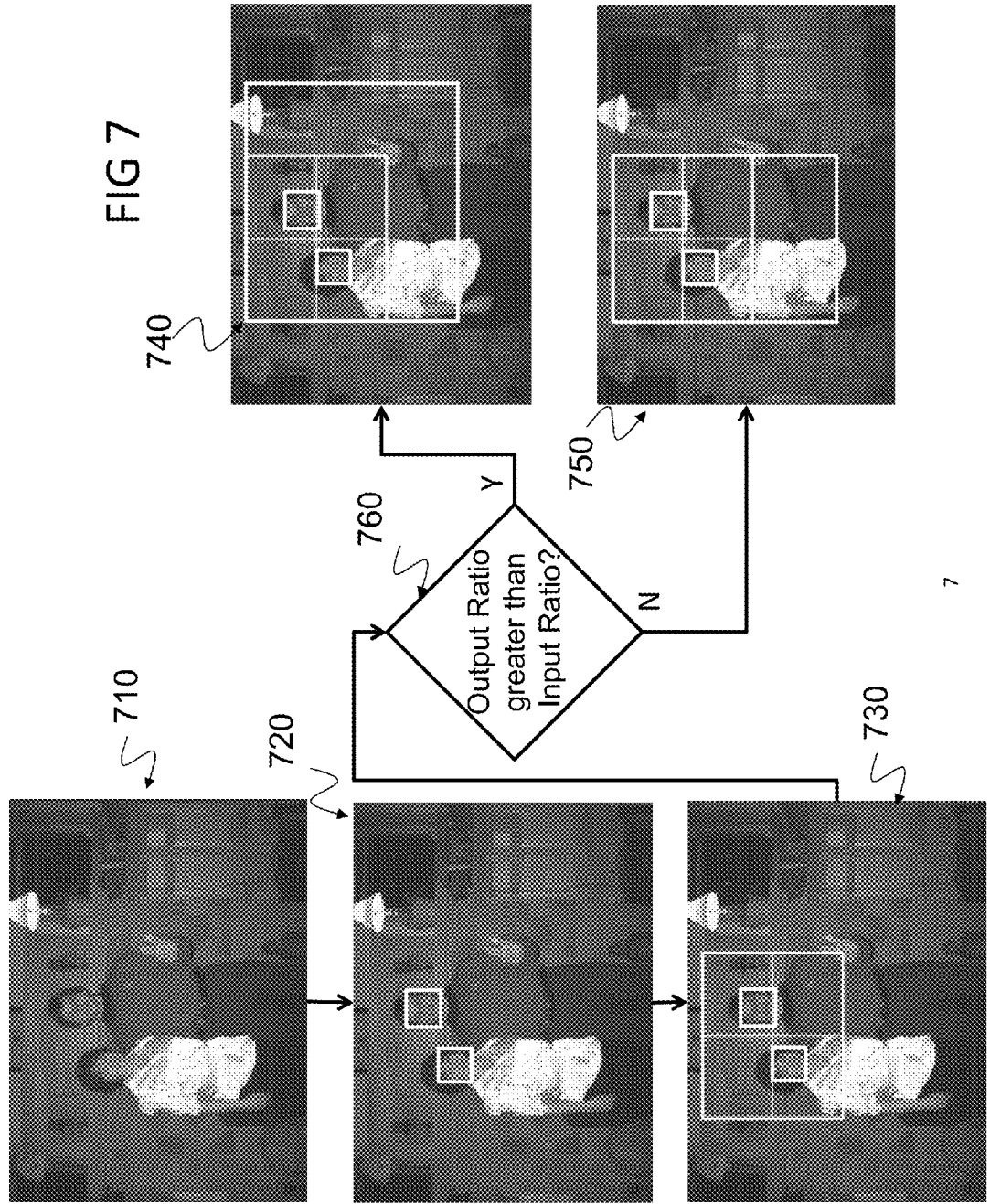

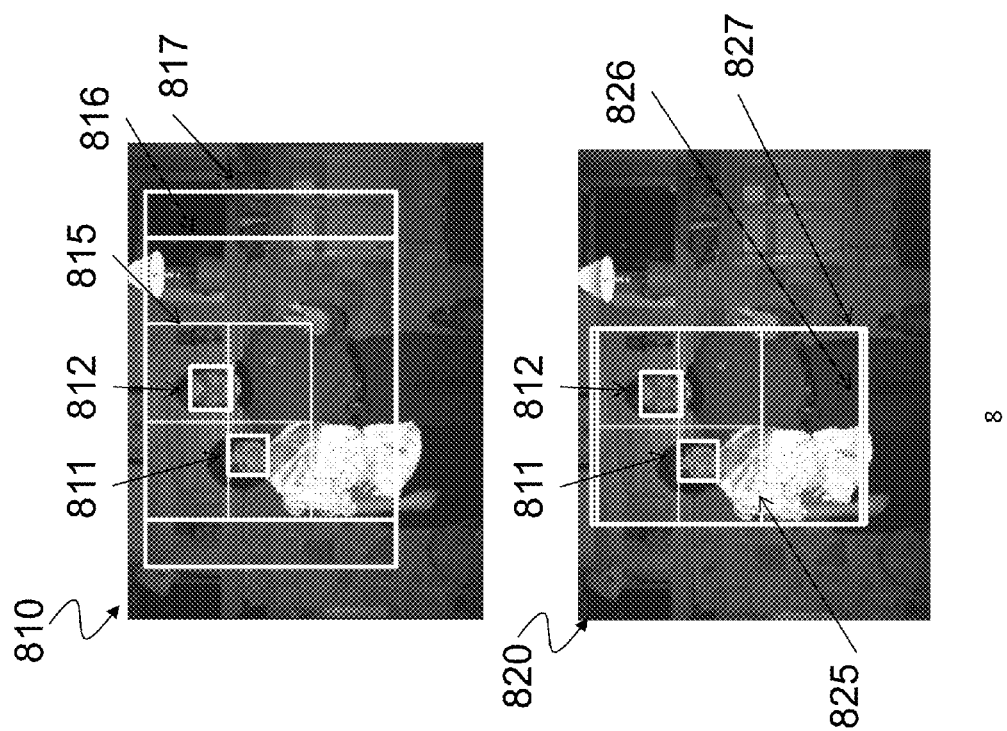

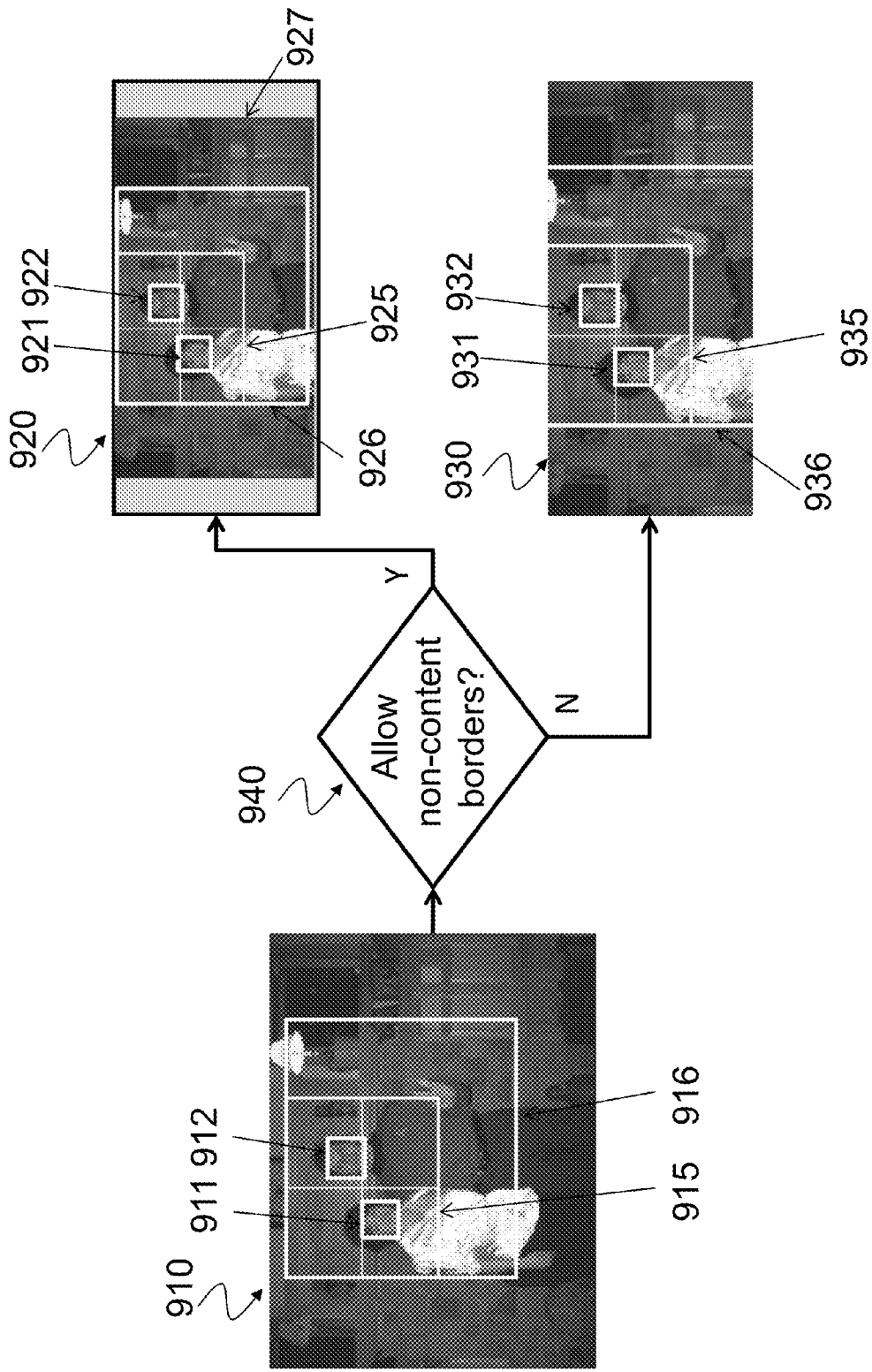

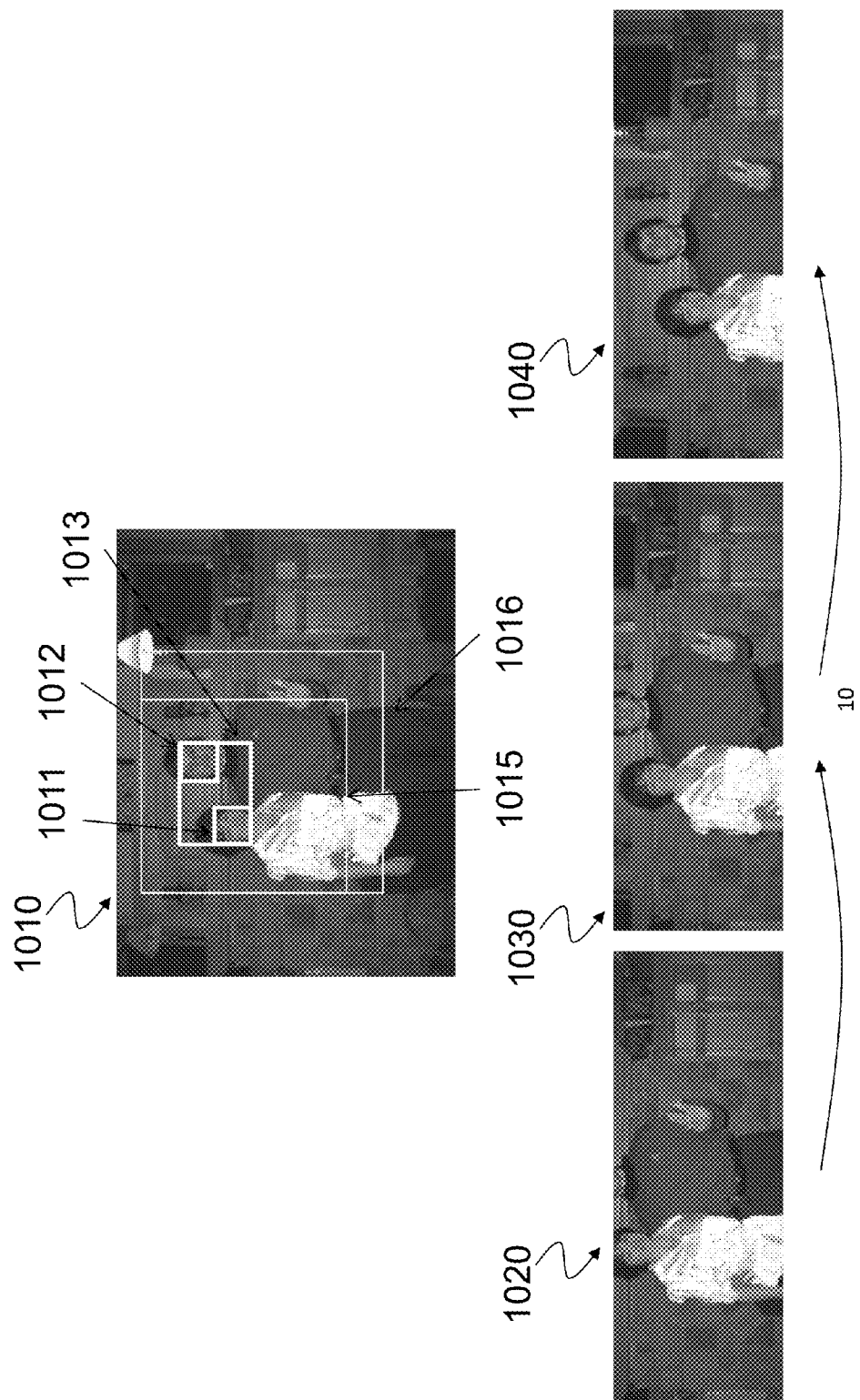

IMAGE RECOMPOSITION FROM FACE DETECTION AND FACIAL FEATURES

CROSS-REFERENCE TO RELATED APPLICATIONS

Jiebo Luo, Robert T. Gray, and Edward B. Gindele, "Producing an Image of a Portion of a Photographic Image onto a Receiver using a Digital Image of the Photographic Image", U.S. Pat. No. 6,545,743;

Jiebo Luo, "Automatically Producing an Image of a Portion of a Photographic Image", U.S. Pat. No. 6,654,507;

Jiebo Luo, Robert T. Gray, "Method for Automatically Creating Cropped and Zoomed Versions of Photographic Images", U.S. Pat. No. 6,654,506;

Jiebo Luo, "Method and Computer Program Product for Producing an Image of a Desired Aspect Ratio", U.S. Pat. No. 7,171,058.

The U.S. Patents listed above are assigned to the same assignee hereof, Eastman Kodak Company of Rochester, N.Y., and contain subject matter related, in certain respect, to the subject matter of the present application. The above-identified patents are incorporated herein by reference in their entirety.

FIELD OF THE INVENTION

This invention relates to digital image enhancement, and more particularly to methods and apparatuses for automatically generating pleasing compositions of digital images using locations and sizes of faces in the digital images.

BACKGROUND OF THE INVENTION

In the field of photography, in particular digital photography, amateur photographers have little or no training on how to take photos of pleasing composition. The resulting photographs they take are often ill composed. It would be beneficial if a digital image processing algorithm could recompose the original shot such that it represented the shot that the photographer had wished he/she had taken in the first place. Furthermore, even if the photographer captured a pleasing composition, it is often desired to display or print that photograph with a differing aspect ratio. This is typically accomplished by digitally cropping the digital photograph. For example, many consumer digital cameras have a 4:3 aspect ratio, while many new televisions have a 16:9 aspect ratio. The task of indiscriminately trimming (without regard to content) the 4:3 aspect ratio to a 16:9 aspect ratio often eliminates image content at the top and bottom of an image and so can cut off faces of persons in the image or otherwise obscures portions of the main subject in the image. It is currently common to capture imagery using a smart phone. By holding the camera in a landscape or a portrait orientation, the aspect ratio of the captured picture can vary quite a bit. Further, after sharing this photo with a friend, upon opening up the image on the friend's computer, or another device, the aspect ratio of the display device or of the displayed photo will often be different yet again. Further, uploading the image to a social website may crop the image in an undesirable fashion yet again. All of these examples illustrate cases that could benefit from the invention described herein.

Several main subject detection algorithms have been programmed to extract what is determined to be the main subject of a still digital image. For example, U.S. Pat. No. 6,282,317 describes a method to automatically segment a digital image into regions and create a belief map corresponding to the importance of each pixel in the image. Main subject areas have the highest values in the belief map. Using this belief map, a more pleasing composition, or a preferred re-composition into a different aspect ratio of the input image is often attainable. However, despite using complex rules and sophisticated learning techniques, the main subject is often mislabeled and the computational complexity of the algorithm is generally quite significant.

It is desirable to create both a more robust, and a less compute intensive algorithm for generating aesthetically pleasing compositions of digital images. In consumer photography, surveys have shown that the human face is by far the most important element to consumers. Face detection algorithms have become ubiquitous in digital cameras and PCs, with speeds less than 50 ms on typical PCs. Several main subject detection algorithms capitalize on this, and often treat human face areas as high priority areas. For example, U.S. Pat. No. 6,940,545 describes an automatic face detection algorithm and then further describes how the size and location of said faces might feed measured variables into an auto zoom crop algorithm. U.S. Pat. No. 7,317,815 describes the benefits of using face detection information not only for cropping, but for focus, tone scaling, structure, and noise. When face detection information is bundled with existing main subject detection algorithms, the resulting beneficial performance is increased. Unfortunately, although this improvement has resulted in more pleasing contributions overall, it fails to recognize that human faces are much more important than other image components. As a result, these algorithms do not adequately incorporate face information and, instead, emphasize other main subject predictors. For baseline instantiations, face information could be limited to facial size and location, but for superior performance face information can be expanded to include facial pose, blink, eye gaze, gesture, exposure, sharpness, and subject interrelationships. If no faces are found in an image, or if found faces are deemed irrelevant, only then is reverting back to a main subject detection algorithm a good strategy for arranging aesthetically pleasing compositions.

What is needed are methods and apparatuses that will automatically convert complex digital facial information into a pleasing composition. Efficient algorithms designed to accomplish these goals will result in more robust performance at a lower CPU cost.

SUMMARY OF THE INVENTION

A preferred embodiment of the present invention comprises a computing system with an electronic memory for storing a digital image and a processor for accessing the memory and identifying any individual regions in the digital image that each include a human face, padding each of the individual regions, digitally defining two or more combined padded regions that each include one or more individual padded regions, and automatically evaluating each of the combined padded regions including assigning a fitness score to each of the combined padded regions, and ignoring at least one of the combined padded regions whose fitness score is below a known threshold. Each of the borders of the at least one combined region is selected so as to be collinear with at least one border of the individual regions. The processor comprises a program for automatically modifying the digital image such that the at least one combined region satisfies a strict rule of thirds.

Another preferred embodiment of the present invention comprises a computing system with an electronic memory for storing a digital image, a processor for accessing the digital image and identifying at least one individual region in the digital image that includes a human face, padding each of the two or more individual regions, digitally defining two or more combined padded regions that each include one or more individual padded regions, automatically evaluating each of the combined padded regions including assigning a fitness score to each of the combined padded regions, and automatically modifying the digital image such that a highest scoring one of the combined padded regions satisfies a broad rule of thirds. The processor comprises a program for using a weighted centroid of the multiple highest scoring ones of the combined padded regions to satisfy the broad rule of thirds, wherein the weighted centroid is defined by the fitness scores of the multiple highest scoring ones of the combined padded regions such that a location of the weighted centroid is proportionally closer to a centroid of a higher scoring one of the combined padded regions in proportion to the scores of the combined padded regions.

Another preferred embodiment of the present invention comprises a computing system having an electronic memory for storing a digital image, and a processor for identifying any individual regions in the digital image that each include a human face, for padding each of the two or more individual regions, for digitally defining two or more combined padded regions that each include one or more individual padded regions, for receiving a request for an output aspect ratio for a modified digital image, for automatically evaluating each of the combined padded regions including assigning a fitness score to each of the combined padded regions, and for ignoring one or more lowest scoring ones of the combined padded regions if all the combined padded regions cannot fit in the requested output aspect ratio format. It has the additional advantages that the padding around faces changes as the input and output aspect ratio; that the low priority bounding box be constrained to pleasing composition rules; that the low priority bounding box be attenuated if it is determined that the input digital image was already cropped or resampled; that in softcopy viewing environments it displays a multiple of output images, each aesthetically pleasing based upon composition, subject, or clusters of subjects.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

In addition to the embodiments described above, further embodiments will become apparent by reference to the drawings and by study of the following detailed description.

BRIEF DESCRIPTION OF THE DRAWINGS

Preferred embodiments of the present invention will be more readily understood from the detailed description of exemplary embodiments presented below considered in conjunction with the attached drawings, of which:

FIGS. 5A-5C illustrate algorithms according to an embodiment of the present invention.

FIGS. 6A-6B illustrate a stepwise algorithm according to an embodiment of the present invention.

FIG. 7 illustrates a stepwise algorithm according to an embodiment of the present invention.

FIG. 8 illustrates a stepwise algorithm according to an embodiment of the present invention.

FIG. 9 illustrates a stepwise algorithm according to an embodiment of the present invention.

FIG. 10 illustrates a stepwise algorithm according to an embodiment of the present invention.

DETAILED DESCRIPTION OF THE INVENTION

Preferred embodiments of the present invention describe systems, apparatuses, algorithms, and methods of a fully-automatic means of determining and generating a pleasing re-composition of an input digital image. These are applicable to any desired (user requested) output aspect ratio given an input digital image of any aspect ratio. If the desired output aspect ratio matches the given input aspect ratio, the determination may be considered a zoomed re-composition. If the desired output aspect ratio is different from the given input aspect ratio, this may be considered a constrained re-composition. If the output aspect ratio is unconstrained, this may be considered an unconstrained re-composition. These automatic re-compositions are described herein.

Figure 1:
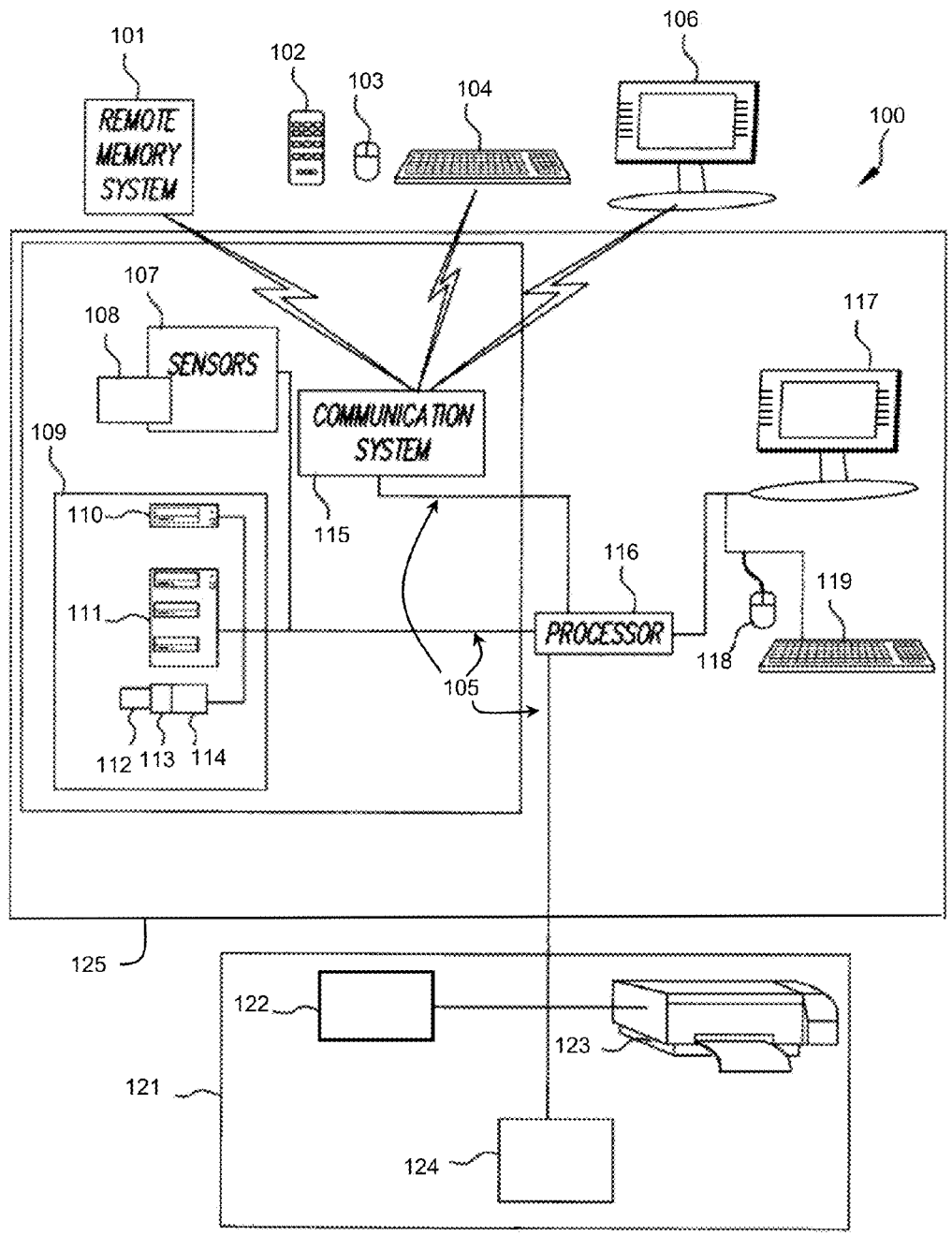
FIG. 1 illustrates components of an apparatus and system for modifying a digital image according to a preferred embodiment of the present invention.

FIG. 1 illustrates in a generic schematic format a computing system for implementing preferred embodiments of the present invention. Electronic apparatus and processing system 100 is used for automatically recompositing digital images. In a preferred embodiment as illustrated in FIG. 1, electronic computing system 100 comprises a housing 125 and local memory or storage containing data files 109, optional remote user input devices 102-104, local user input devices 118-119, an optional remote output system 106, and a local output system 117, wherein all electronics are either hardwired to processor system 116 or optionally connected wirelessly thereto via Wi-Fi or cellular through communication system 115. Output systems 106 and 117 depict display screens and audio speakers. While these displays and speakers are illustrated as standalone apparatuses, each can also be integrated into a hand held computing system such as a smart phone. The computer system 100 may include specialized graphics subsystem to drive output display 106, 117. The output display may include a CRT display, LCD, LED, or other forms. The connection between communication system 115 and the remote I/O devices is also intended to represent local network and interne (network) connections to processing system 116. Various output products in final form produced by the algorithms described herein, either manually or automatically, may be optionally intended as a final output only on a digital electronic display, not intended to be printed, such as on output systems 106, 117, which are depicted herein as example displays and are not limited by size or structure as may be implied by their representation in the Figures herein. Optional remote memory system 101 can represent network accessible storage, and storage such as used to implement cloud computing technology. Remote and local storage (or memory) illustrated in FIG. 1 can be used as necessary for storing computer programs and data sufficient for processing system 116 to execute the algorithms disclosed herein. Data systems 109, user input systems 102-104 and 118-119 or output systems 106 and 117, and processor system 116 can be located within housing 125 or, in other preferred embodiments, can be individually located in whole or in part outside of housing 125.

Data systems 109 can include any form of electronic or other circuit or system that can supply digital data to processor system 116 from which the processor can access digital images for use in automatically improving the composition of the digital images. In this regard, the data files delivered from systems 109 can comprise, for example and without limitation, programs, still images, image sequences, video, graphics, multimedia, and other digital image and audio programs such as slideshows. In the preferred embodiment of FIG. 1, sources of data files also include those provided by sensor devices 107, data received from communication system 115, and various detachable or internal memory and storage devices coupled to processing system 116 via systems 109.

Sensors 107 are optional and can include light sensors, audio sensors, image capture devices, biometric sensors and other sensors known in the art that can be used to detect and record conditions in the environment of system 100 and to convert this information into a digital form for use by processor system 116. Sensors 107 can also include one or more sensors 108 that are adapted to capture digital still or video images. Sensors 107 can also include biometric or other sensors for measuring human voluntary and involuntary physical reactions, such sensors including, but not limited to, voice inflection detection, body movement, eye movement, pupil dilation, body temperature, and p10900 wave sensors.

Storage/Memory systems 109 can include conventional memory devices such as solid state, magnetic, HDD, optical or other data storage devices, and circuitry for reading removable or fixed storage media. Storage/Memory systems 109 can be fixed within system 100 or can be removable, such as HDDs and floppy disk drives. In the embodiment of FIG. 1, system 100 is illustrated as having a hard disk drive (HDD) 110, disk drives 111 for removable disks such as an optical, magnetic or specialized disk drives, and a slot 114 for portable removable memory devices 112 such as a removable memory card, USB thumb drive, or other portable memory devices, including those which may be included internal to a camera or other handheld device, which may or may not have a removable memory interface 113 for communicating through memory slot 114. Although not illustrated as such, memory interface 113 also represents a wire for connecting memory devices 112 to slot 114. Data including, but not limited to, control programs, digital images, application programs, metadata, still images, image sequences, video, graphics, multimedia, and computer generated images can also be stored in a remote memory system 101, as well as locally, such as in a personal computer, network server, computer network or other digital system such as a cloud computing system. Remote system 101 is shown coupled to processor system 116 wirelessly, however, such systems can also be coupled over a wired network connection or a mixture of both.

In the embodiment shown in FIG. 1, system 100 includes a communication system 115 that in this embodiment can be used to communicate with an optional remote memory system 101, an optional a remote display 106, and/or optional remote inputs 102-104. A remote input station including remote display 106 and/or remote input controls 102-104 communicates with communication system 115 wirelessly, as illustrated, or can communicate as a wired network. Local input station including either or both a local display system 117 and local inputs can be connected to processor system 116 using a wired (illustrated) or wireless connection such as Wi-Fi or infra red transmission.

Communication system 115 can comprise for example, one or more optical, radio frequency or other transducer circuits or other systems that convert image and other data into a form that can be conveyed to a remote device such as remote memory system 101 or remote display device 106 configured with digital receiving apparatus, using an optical signal, radio frequency signal or other form of signal. Communication system 115 can also be used to receive a digital image and other digital data from a host or server computer or network (not shown) or a remote memory system 101. Communication system 115 provides processor system 116 with information and instructions from corresponding signals received thereby. Typically, communication system 115 will be adapted to communicate with the remote memory system 101, or output system 106 by way of a communication network such as a conventional telecommunication or data transfer network such as the interne, a cellular, peer-to-peer or other form of mobile telecommunication network, a local communication network such as wired or wireless local area network or any other conventional wired or wireless data transfer system.

User input systems provide a way for a user of system 100 to provide instructions, or selections via a customized user interface, to processor system 116. This allows such a user to select digital image files to be used in automatically recompositing digital images and to select, for example, an output format for the output images. User input system 102-104 and 118-119 can also be used for a variety of other purposes including, but not limited to, allowing a user to select, manually arrange, organize and edit digital image files to be incorporated into the image enhancement routines described herein, to provide information about the user or audience, to provide annotation data such as voice and text data, to identify and tag characters in the content data files, to enter metadata not otherwise extractable by the computing system, and to perform such other interactions with system 100 as will be described herein.

In this regard user input systems 102-104 and 118-119 can comprise any form of transducer or other device capable of receiving an input from a user and converting this input into a form interpreted by processor system 116. For example, user input system can comprise a touch screen input at 106 and 117, a touch pad input, a 4-way switch, a 6-way switch, an 8-way switch, a stylus system, a trackball system or mouse such as at 103 and 118, a joystick system, a voice recognition system such as at 108, a gesture recognition system such as at 107, a keyboard, a remote control 102, cursor direction keys, on screen keyboards, or other such systems. In the embodiment shown in FIG. 1, remote input system can take a variety of forms, including, but not limited to, a remote keyboard 104, a remote mouse 103, and a remote control 102. Local input system includes local keyboard 119, a local mouse 118, microphone 108, and other sensors 107, as described above.

Additional input or output systems 121 are used for obtaining or rendering images, text or other graphical representations. In this regard, input/output systems 121 can comprise any conventional structure or system that is known for providing, printing or recording images, including, but not limited to, printer 123 and, for example, scanner 122. Printer 123 can record images on a tangible surface using a variety of known technologies including, but not limited to, conventional four color offset separation printing. Other contact printing such as silk screening can be performed or dry electrophotography such as is used in the NexPress 2100 printer sold by Eastman Kodak Company, Rochester, N.Y., USA, thermal printing technology, drop on demand ink jet technology, and continuous inkjet technology, or any combination of the above which is represented at 122-124. For the purpose of the following discussions, printer 123 will be described as being of a type that generates color images printed upon compatible media. However, it will be appreciated that this is not required and that the methods and apparatuses described and claimed herein can be practiced with a printer 123 that prints monotone images such as black and white, grayscale or sepia toned images.

In certain embodiments, the source of data files 109, user input systems 102-104 and output systems 106, 117, and 121 can share components. Processor system 116 operates system 100 based upon signals from user input system 102-104 and 118-119, sensors 107-108, storage/memory 109 and communication system 115. Processor system 116 can include, but is not limited to, a programmable digital computer, a programmable microprocessor, a programmable logic processor, multi-processing systems, a chipset, a series of electronic circuits, a series of electronic circuits reduced to the form of an integrated circuit, or a series of discrete components on a printed circuit board.

As will be described below, processing system 100 can be configured as a workstation, laptop, kiosk, PC, and hand held devices such as cameras and smart phones. As an exemplary workstation, the computer system central processing unit 116 communicates over an interconnect bus 105. The CPU 116 may contain a single microprocessor, or may contain a plurality of microprocessors for configuring the computer system 100 as a multi-processor system, and high speed cache memory comprising several levels. The memory system 109 may include a main memory, a read only memory, mass storage devices such as tape drives, or any combination thereof. The main memory typically includes system dynamic random access memory (DRAM). In operation, the main memory stores at least portions of instructions for executions by the CPU 116. For a workstation, for example, at least one mass storage system 110 in the form of an HDD or tape drive, stores the operating system and application software. Mass storage 110 within computer system 100 may also include one or more drives 111 for various portable media, such as a floppy disk, a compact disc read only memory (CD-ROM or DVD-ROM), or an integrated circuit non-volatile memory adapter 114 (i.e. PC-MCIA adapter) to provide and receive instructions and data to and from computer system 100.

Computer system 100 also includes one or more input/output interfaces 142 for communications, shown by way of example as an interface for data communications to printer 123 or another peripheral device 122-124. The interface may be a USB port, a modem, an Ethernet card or any other appropriate data communications device. The physical communication links may be optical, wired, or wireless. If used for scanning, the communications enable the computer system 100 to receive scans from a scanner 122, or documentation therefrom, to a printer 123 or another appropriate output or storage device.

As used herein, terms such as computer or "machine readable medium" refer to any non-transitory medium that stores or participates, or both, in providing instructions to a processor for execution. Such a medium may take many forms, including but not limited to, non-volatile media and volatile media. Non-volatile media include, for example, optical or magnetic disks, flash drives, and such as any of the storage devices in any computer(s) operating as one of the server platforms, discussed above. Volatile media include dynamic memory, such as main memory of such a computer platform. Transitory physical transmission media include coaxial cables; copper wire and fiber optics, including the wires that comprise a bus within a computer system, a carrier wave transporting data or instructions, and cables or links transporting such a carrier wave. Carrier-wave transmission media can take the form of electric or electromagnetic signals, or acoustic or light waves such as those generated during radio frequency (RF) and infrared (IR) data communications. Common forms of non-transitory computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

Figure 2:
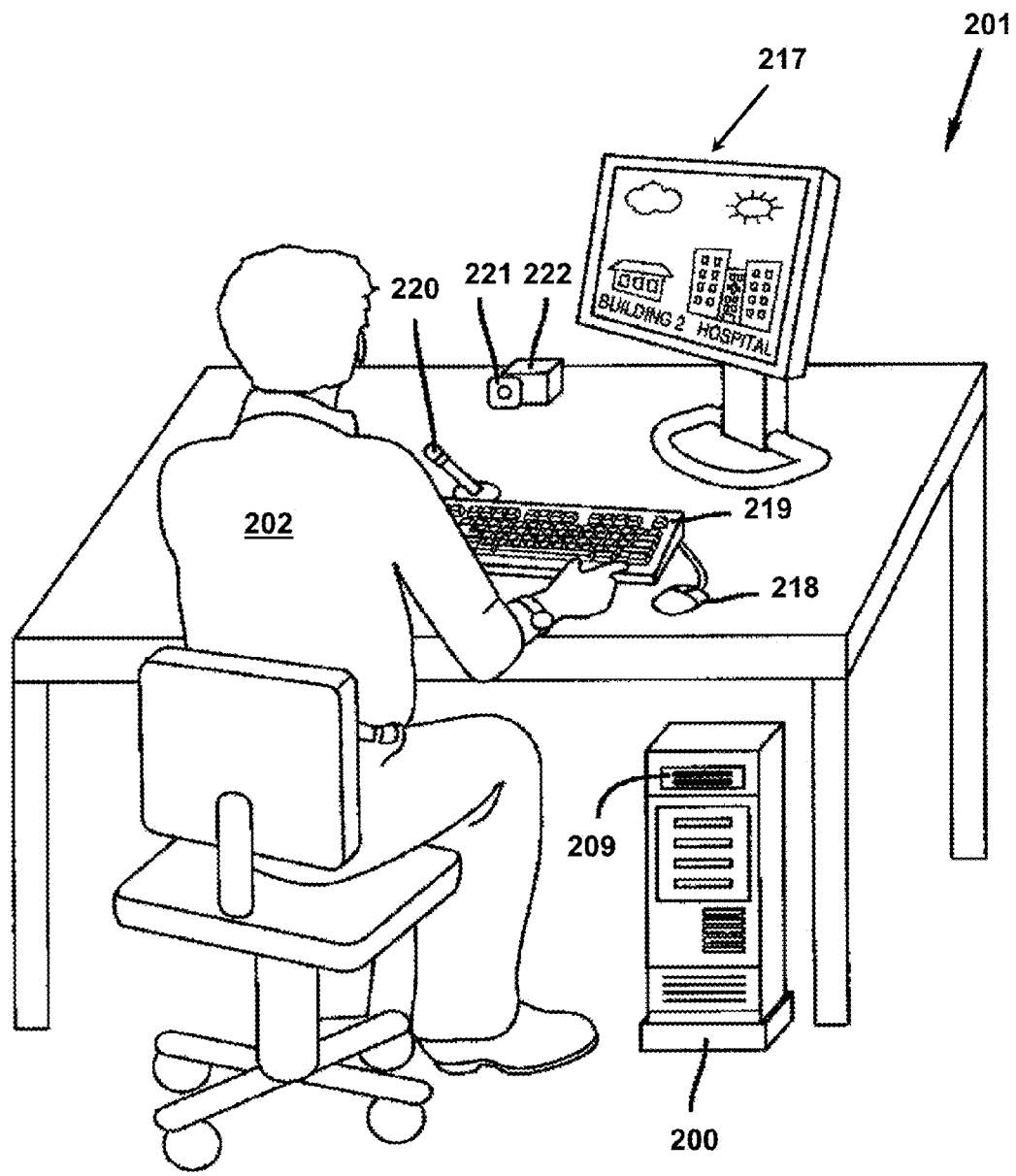
FIG. 2 illustrates a computer system embodiment for modifying a digital image according to a preferred embodiment of the present invention.

As is illustrated in FIG. 2, an example implementation of the processing system just described is embodied as example workstation 200 and connected components as follows. Processing system 200 and local user input system 218-222 can take the form of an editing studio or kiosk 201 (hereafter also referred to as an "editing area"), although this illustration is not intended to limit the possibilities as described in FIG. 1 of potential implementations. Local storage or memory 209 can take various forms as described above with regard to data systems 109. In this illustration, a user 202 is seated before a console comprising local keyboard 219 and mouse 218 and a local display 217 which is capable, for example, of displaying multimedia content. As is also illustrated in FIG. 2, the editing area can also have sensors 220-222 including, but not limited to, audio sensors 220, camera or video sensors 222, with built in lenses 221, and other sensors such as, for example, multispectral sensors that can monitor user 202 during a user production session. Display 217 can be used as a presentation system for presenting output products or representations of output products in final form or as works-in-progress. It can present output content to an audience, such as user 202, and a portion of sensors 221, 222 can be adapted to monitor audience reaction to the presented content. It will be appreciated that the material presented to an audience can also be presented to remote viewers.

1.0 Modification Conditions

Figure 3:
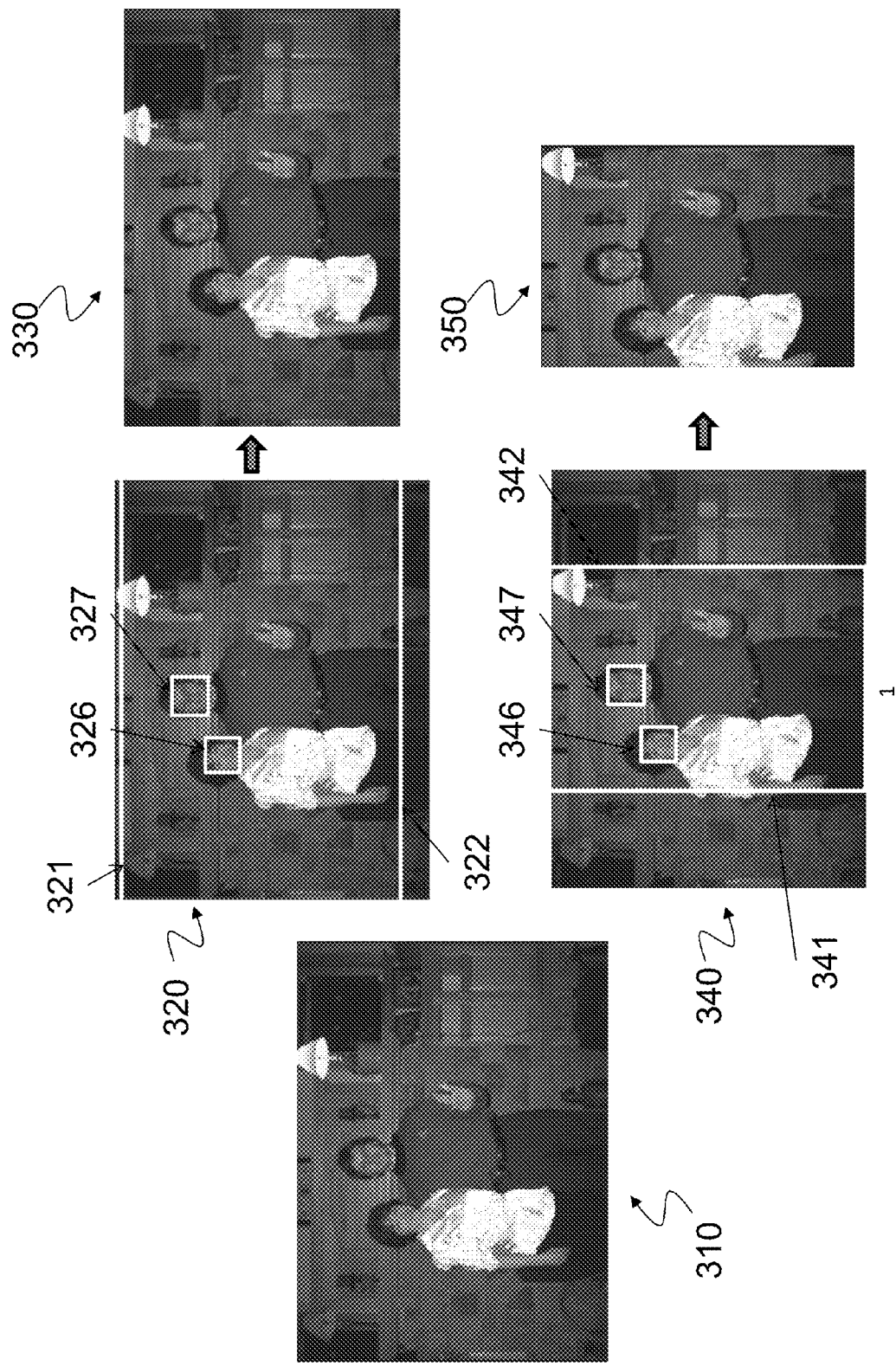
FIG. 3 illustrates a stepwise example of an automatic re-composition of a digital image according to an embodiment of the present invention.

A need for re-composition commonly occurs when there is an aspect ratio mismatch between an input digital image and a desired recomposited output aspect ratio for the digital image. As used herein, an input digital image refers to a digital image that is to be recomposited using the methods and apparatuses described herein. This includes input digital images that are selected by users as input images to be recomposited. They can be unmodified digital images, i.e. unchanged from their initial captured state, or previously modified using any of a number of software products for image manipulation. An output image refers to a modified or adjusted digital image using the automatic re-composition methods and apparatuses described herein. These also include desired output aspect ratios as selected by users of these methods and apparatuses. For example, many digital cameras capture 4:3 aspect ratio images. If the consumer wants to display this image on a 16:9 aspect ratio television, digital frame, or other display apparatus, or create a 6"×4" or 5"×7" print to display in a picture frame, the difference between the 4:3 input aspect ratio and the output display areas needs to be rectified. This conversion is referred to as auto-trim and is pervasive in the field of photography. The simplest solution, which disregards image content, is to zoom in as little as possible such that the 16×9 output aspect ratio frame, also known as a crop mask or crop box, is contained within in the original input image. This typically eliminates top and bottom border portions of the input image. FIG. 3 illustrates an input 4:3 image, 310, along with landscape (6×4) layout cropping, pre-crop and post-crop 320 and 330, respectively, and portrait (5×7) layout cropping, 340 and 350. The squares 326, 327, 346, 347 illustrated in 320 and 340 are face boundaries (or face boxes) as determined by an automatic face detection algorithm and are superimposed over the images. These can be generated by a camera processing system and displayed on a camera display screen or on a PC processing system and displayed on a PC monitor, or other processing systems with a display, such as an iPad or similar portable devices. Images 320 and 330 demonstrate a minimal zoom method for extracting a 6:4 crop area from image 310. When the output aspect ratio is greater than the input aspect ratio (e.g. 6:4>4:3), the minimal zoom method necessitates cropping off portions of the top and bottom of the input image. A common rule of thumb, typically programmed for automatic operation, is to crop 25% off the top and 75% off the bottom (wherein the total image area to be cropped or removed represents 100%) to minimize the possibility of cutting off any heads of people in the photograph. The automatically generated horizontal lines 321, 322 in image 320, the crop mask, show the 6:4 crop area, and 330 illustrates the final cropped image. When the output aspect ratio is less than the input aspect ratio (e.g. 5:7<4:3), a programmed minimal zoom algorithm crops off portions at the left and right borders of the input image. The vertical lines 341, 342 in image 340 show the automatically generated 5:7 crop area, and 350 demonstrates the final cropped image. When cropping areas on the left and right, it is common to program a center crop algorithm, i.e. crop 50% off each of the left and right edges of the image (wherein the total image area to be cropped or removed represents 100%). These methods of doing auto trim are blind to any image content but are fast and work well for many scenes.

Figure 4:
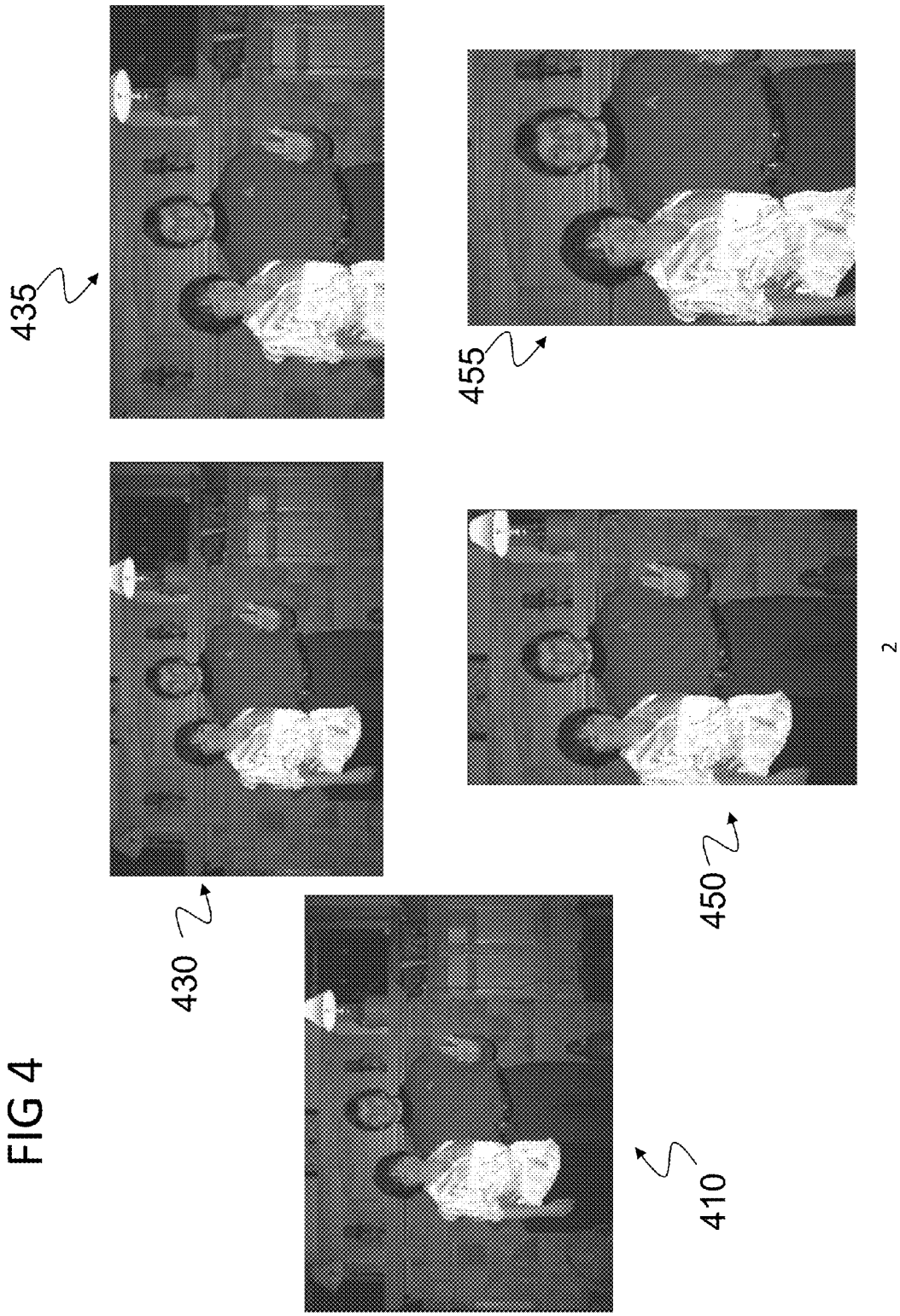
FIG. 4 illustrates another example of an automatic re-composition of a digital image according to an embodiment of the present invention.

More desirable results can be obtained above and beyond the described auto-trim method. If, for example, we had some knowledge of the main subject, we could program our crop box to be centered on this main subject. We could even selectively zoom in or out to just encompass the main subject, removing background clutter. Using the face box locations 326, 327, 346, 347 illustrated in images 320 and 340, along with the desired input and output aspect ratio, an alternate method of trimming can be performed—one which encompasses a selective zoom as well. For example, in FIG. 4, image 410 is the same image as image 310 of FIG. 3, image 430 is the same as image 330, and image 450 is the same as image 350. Referring to FIG. 4, arguably better 6×4 and 5×7 compositions of images 430 and 450 are images 435 and 455, respectively. Images 435 and 455 were created automatically using techniques of the present invention described herein.

A majority of keepsake photographic memories contain pictures of people and, as such, people are often the main subjects in images and so are critical in fulfilling re-composition requests. Using computer methods described in the article "Rapid object detection using a boosted cascade of simple features," by P. Viola and M. Jones, in *Computer Vision and Pattern Recognition,* 2001, *Proceedings of the 2001 IEEE Computer Society Conference,* 2001, pp. I-511-I-518 vol. 1; or in "Feature-centric evaluation for efficient cascaded object detection," by H. Schneiderman, in *Computer Vision and Pattern Recognition,* 2004; *Proceedings of the 2004 IEEE Computer Society Conference,* 2004, pp. II-29-11-36, Vol. 2., the size and location of each face can be found within each image. These two documents are incorporated by reference herein in their entirety. Viola utilizes a training set of positive face and negative non-face images. Then, simple Haar-like wavelet weak classifier features are computed on all positive and negative training images. While no single Haar-like feature can classify a region as face or non-face, groupings of many features form a strong classifier that can be used to determine if a region is a face or not. This classification can work using a specified window size. This window is slid across and down all pixels in the image in order to detect faces. The window is enlarged so as to detect larger faces in the image. The process repeats until all faces of all sizes are found in the image. Because this process can be quite compute intensive, optimizations such as an integral image and cascades of weak classifiers make the algorithm work faster. Not only will this process find all faces in the image, it will return the location and size of each face. These algorithms have been optimized such that they can find all faces in real time on typical cameras, smart phones, iPads, PCs or other computing systems.

Once a face is found, neural networks, support vector machines, or similar classifying means can be trained to locate specific features such as eyes, nose, and mouth; and then corners of eyes, eye brows, chin, and edge of cheeks can be found using geometric rules based upon anthropometric constraints such as those described in "*Model Based Pose in 25 Lines of Code*", by DeMenthon, Daniel F, Davis, Larry S., *Proceedings from the Image Understanding Workshop,* 1992. Active shape models as described in "Active shape models—their training and application," by Cootes, T. F. Cootes, C. J. Taylor, D. H. Cooper, and J. Graham, *Computer Vision and Image Understanding,* vol. 61, pp. 38-59, 1995, can be used to localize all facial features such as eyes, nose, lips, face outline, and eyebrows. These two documents are incorporated by reference herein in their entirety. Using the features that are thus found, it is possible to determine if eyes/mouth are open, or if the expression is happy, sad, scared, serious, neutral, or if the person has a pleasing smile. Determining pose uses similar extracted features, as described in "*Facial Pose Estimation Using a Symmetrical Feature Model*", by R. W.

Ptucha, A. Savakis, *Proceedings of ICME—Workshop on Media Information Analysis for Personal and Social Applications*, 2009, which develops a geometric model that adheres to anthropometric constraints. This document is incorporated by reference herein in its entirety. With pose and expression information stored in association with each face, preferred embodiments of the present invention can be programmed to give more weight towards some faces, for example, a person looking forward with a smile is more important than a person looking to the left with an expression determined to be less desirable. Images having faces with more weight can then be ranked and preferentially selected for any proposed use. Ranked images can be identified and a sorted list can be compiled, stored, updated from time to time due to new images added to a collection, or because of new ranking algorithms. The sorted list can be accessed for future use. As another example of preferential weighting, if a face or faces are looking to the left in an image, the cropped out area for that image can be programmed to be biased toward the right. For example, a center crop algorithm, as described above, can be adjusted to assign more than 50% of the crop area to one side (right side, in this example) of the image.

In many instances there are no people depicted in an image, but there is a main subject that is not a person or that does not contain a recognizable face. A main subject detection algorithm, such as the one described in U.S. Pat. No. 6,282,317, which is incorporated herein by reference in its entirety, can be used instead of or in conjunction with face detection algorithms to guide automatic zoomed re-composition, constrained re-composition, or unconstrained re-composition. Exemplary preferred embodiments of such algorithms involve segmenting a digital image into a few regions of homogeneous properties such as color and texture. Region segments can be grouped into larger regions based on such similarity measures. Regions are algorithmically evaluated for their saliency using two independent yet complementary types of saliency features—structural saliency features and semantic saliency features. The structural saliency features are determined by measurable characteristics such as location, size, shape and symmetry of each region in an image. The semantic saliency features are based upon previous knowledge of known objects/regions in an image which are likely to be part of foreground (for example, statues, buildings, people) or background (for example, sky, grass), using color, brightness, and texture measurements. For example, identifying key features such as flesh, face, sky, grass, and other green vegetation by algorithmic processing are well characterized in the literature. The data for both semantic and structural types can be integrated via a Bayes net as described in "Artificial Intelligence—A Modern Approach," by Russell and Norvig, 2$^{nd}$ Edition, Prentice Hall, 2003, to yield the final location of the main subject. This document is incorporated by reference herein in its entirety. Such a Bayes net combines the prior semantic probability knowledge of regions, along with current structural saliency features into a statistical probability tree to compute the specific probability of an object/region being classified as main subject or background. This main subject detection algorithm provides the location of a main subject and the size of the subject as well.

Despite sophisticated processing, automated main subject detectors as described above often miscalculate the main subject areas. Even if facial regions are fed into the main subject detector and are identified as a high priority main subject belief map, the main subject areas found by the main subject detector often downplay the importance of the facial areas. Human observers are so fascinated with faces, that the rendition of the faces in the final image often far outweigh any other subject matter in the scene, and so these prior methods and devices fall short with regard to the advantages provided by preferred embodiments of the present invention. As such, preferred embodiments of the present invention place less emphasis on the compute intensive main subject detection methods described above when faces are found in an image. It has been determined that using only face information for image cropping is both more robust and simpler to process. Only when no faces are found, a preferred embodiment of the present invention reverts back to the main subject detection methods or the auto-trim methods which crop 25% off the top and 75% off the bottom, when cropping vertically, and 50% off each side when cropping horizontally. Further, if there is some remaining compute power available, the facial understanding methods of determining pose, blink, smile, etc., are not only less compute intensive than main subject detection but are much more effective at determining the final crop areas.

2.1 Formation of High and Medium Priority Regions

Referring to FIG. 5A, a preferred embodiment of the present invention begins by performing face detection. The present invention is not constrained to using the particular face detection algorithms incorporated by reference above. Various face detection algorithms are presently found in digital cameras, for example, and highlight image regions containing faces that a user can observe on a camera display. Image 510 shows a sample stylized version of an original image for purposes of clarity in describing an operation of an embodiment of the present inventions. Image 520 shows that same sample image with face location and sizes denoted by the solid line face boxes 521-525. If faces are found, a preferred embodiment of the present invention sorts all found faces from largest to smallest. Faces with width less than or equal to a selectable α % of the largest face width can be programmed to be ignored by the algorithm. In a preferred embodiment, α=33, thereby resulting in ignoring faces less than or equal to approximately ⅑$^{th}$ the area of the largest face (using a square face box as an approximation), however, other values for α can be programmably selected. Remaining faces are "padded" on the top, bottom, left, and right, to demarcate an image area that is preferred not to be cropped both for pleasing composition, and to ensure that the critical features of the face are not accidentally cropped in the final output image. The amount of padding area is a function of the face size and input and output aspect ratio. In the following description, we assume the padding above, below, left, and right of the face box is equal to one face width. Section 6 will describe the precise methods used to determine actual padding amounts used by preferred embodiments of the present invention.

The two small face boxes, 524 and 525, toward the bottom right of the input image 520 are smaller than ⅑$^{th}$ the area of the largest face box 522 in that image, and are thus ignored and are not used any further in the algorithm for this example. The combined face box area is shown as the dotted rectangle 535 in image 530. It is formed in reference to the leftmost, rightmost, topmost, and bottommost borders of the remaining individual face boxes. It is digitally defined by the algorithm and its location/definition can be stored in association with the input image and with the output image. In the description that follows, these regions are illustrated as square or rectangular, which simplifies their definition and storage using horizontal and vertical coordinates. This combined face box area will be referred to as the high priority face box area or, in a shortened form, as the high priority region and can be, in some instances, the same as an individual face box for an image containing only one face box.

Figure 5B:
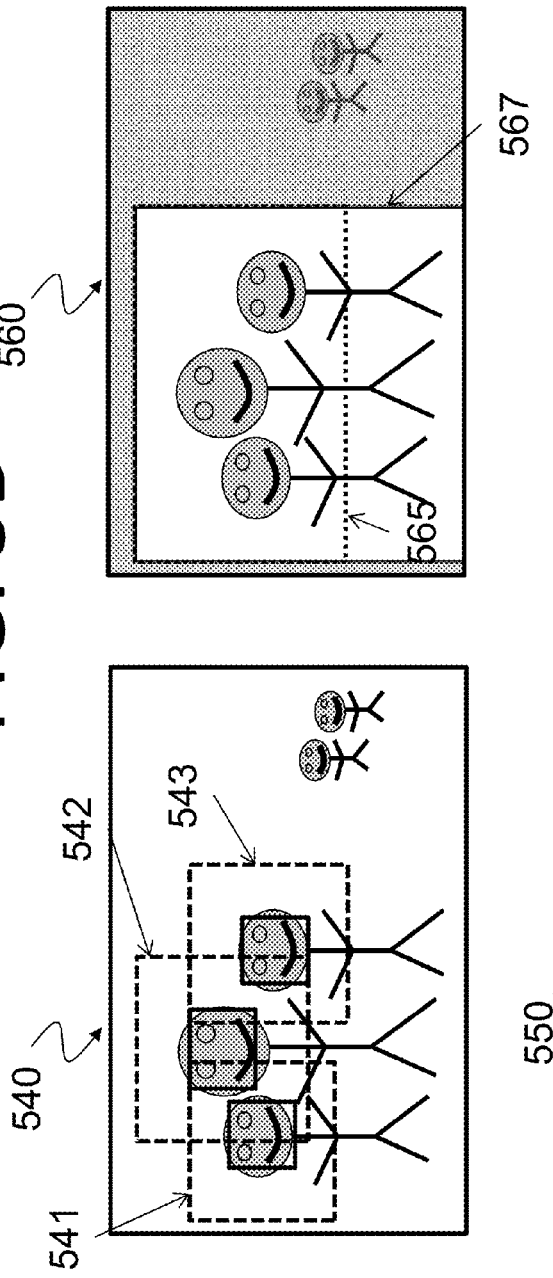
Figure 5C:
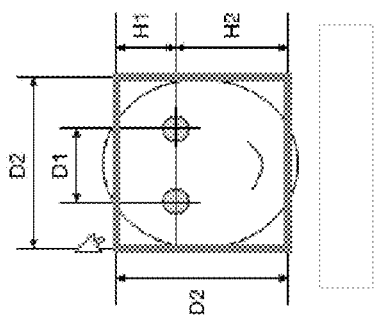

FIG. 5C illustrates a general face box size determination used by typical face detection software. The algorithm initially determines a distance between two points D1 each in a central region of the eyes in a face found in the digital image. The remaining dimensions are computed as follows: the width of the face box D2=2*D1 symmetrically centered about the two points; the distance below the eyes H2=2*H1; the distance above the eyes H1=(2/3)*D1; therefore H2=(4/3)*D1.

Referring to FIG. 5B, the padding around the three faces forms padded face boxes 541-543 in image 540 shown as dashed lines surrounding each face box. The combined padded area forms a single face pad area 555 shown in image 550. This combined face pad area, 555, is referred to as the medium priority combined padded face box area or, in a shortened form, the medium priority region. It is formed in reference to the leftmost, rightmost, topmost, and bottommost borders of the padded face boxes. Using input aspect ratio, desired output aspect ratio and aesthetic rules, the medium priority region is expanded to form the low priority composition box area (described below), or the low priority region, denoted as the clear area, 567 in digital image 560.

Referring to FIG. 5A, if the two faces 524-525 in the lower right of 520 were a little larger, their face width would be greater than $\alpha$ % of the largest face width, and the algorithm would determine that they were intended to be part of the original composition. FIG. 6A demonstrates this scenario as the areas of faces 614 and 615 are each now larger than $1/9^{th}$ of the area of the largest face 612 found in the image 610. Taking the leftmost, rightmost, topmost, and bottommost borders of all 5 individual face boxes forms the borders of the high priority region 618. The padded faces 631-635, using a 1× face width as padding area, are shown in 630. When forming the medium priority region, we allow the formation of multiple medium priority regions. When using the leftmost, rightmost, topmost, and bottommost borders of the padded face boxes, each grouping of padded face boxes forms its own medium priority region, whereas groupings are defined by overlapping padded face boxes. All padded face boxes that overlap belong to a single group and thus define their own medium priority region. In FIG. 6A, we form two medium priority regions, 645 and 647. If, after padding the face boxes, we have two non-overlapping disjoint medium priority regions as shown by 645 and 647 in image 640, the algorithm takes this data and recalculates the high priority region 618. In particular, the algorithm recalculates a corresponding high priority region to go along with each medium priority region, where groupings of faces that contribute to each medium priority region also contribute to their own high priority region shown as 625 and 627 in image 620.

Similar to the criteria described above for ignoring face boxes less than or equal to $\alpha$ % of the largest face box, we include a second criteria at this point of the process by also ignoring all padded face boxes having a width less than or equal to $\beta$ % of the largest padded face box. In a preferred embodiment $\beta$=50 with the result that padded face boxes having an area less than or equal to approximately 1/4 the area of the largest padded face box are ignored (using a square shaped approximation for the padded face box). If medium priority regions are ignored under this process, so are their corresponding high priority regions. Non-discarded medium priority regions will be used to form the low priority region using methods described below. However, the individual padded face boxes 631-635 and medium priority regions 645 and 647 are separately recorded and maintained by the algorithm for possible future usage. For example, if the requested output was a 5:7 portrait layout, it would be impossible to maintain both medium priority regions 645 and 647 in their entirety. Rather than chop off the sides of both, or center weight based upon medium priority region size, a preferred method is to try to include as many medium priority regions as possible in their entirety. In particular, the smallest medium priority regions are ignored, one at a time, until the final constrained re-composition can encompass all remaining medium priority regions in their entirety. This will crop out some people from the picture, but, it will preserve the more important or larger face areas. In the case when one of two or more equally sized medium priority regions are to be ignored, the more centrally located face boxes are given priority. In the example image 640, the final constrained re-composition output aspect ratio, 641 (not shaded) was quite similar to the input aspect ratio of 640. According to the present algorithm, because padded face box 635 falls outside the input image area, an equal amount is cropped from an opposite side of the combined padded face box region (medium priority region) formed by 634 and 635, as explained in Section 6 with relation to FIG. 15. Therefore, both medium priority regions were able to fit within the low priority region 641 in image 640.

Figure 6B:
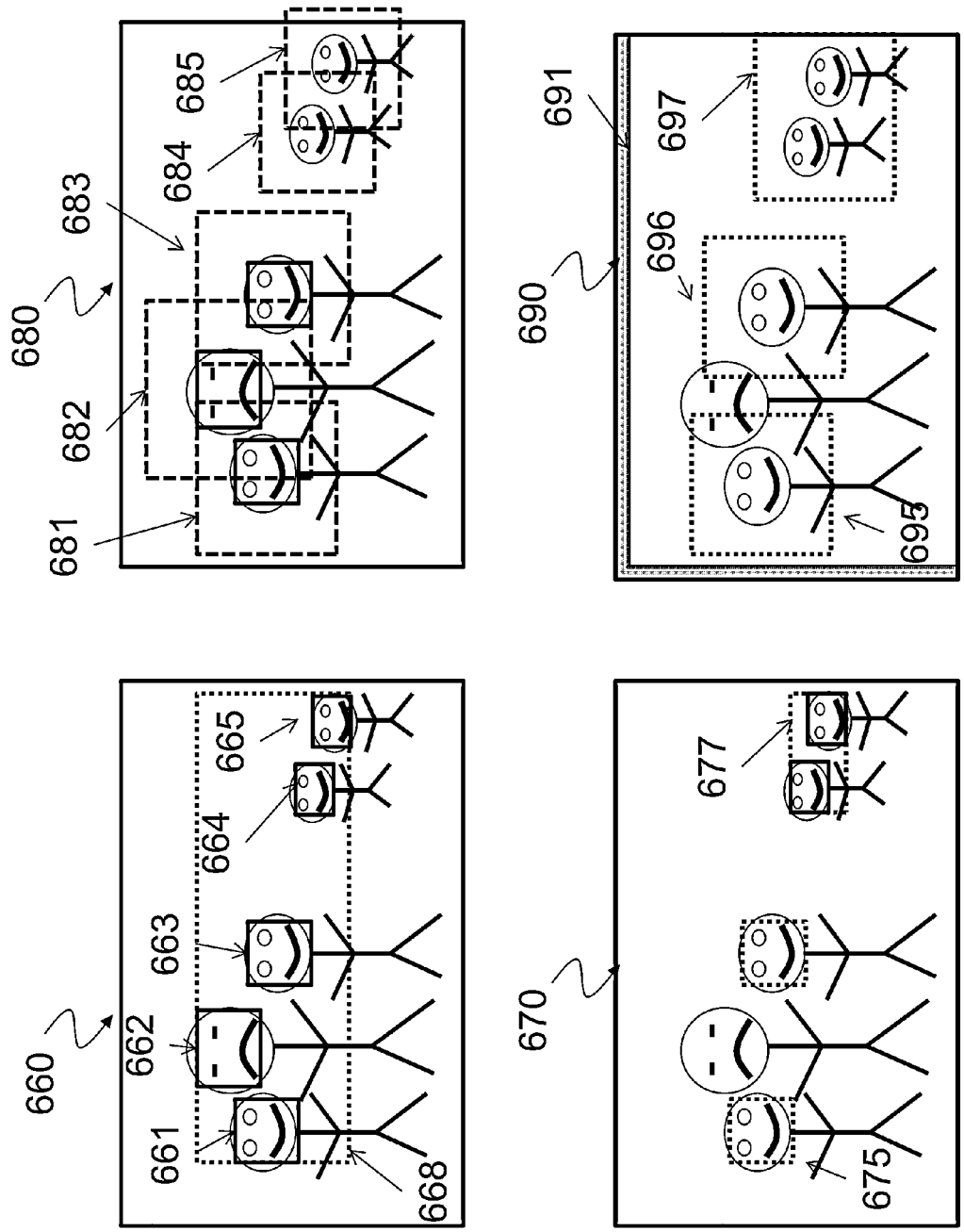

As previously described, faces that are too small (FIG. 5A, faces 524, 525) are ignored. Alternatively, faces that exhibit undesirable characteristics can also be ignored (we discuss below how they can be maintained in the initial formation of the low priority region, weighted lower, and then optionally ignored, based upon weight, during the formation of the final constrained aspect ratio crop box). Image 660 in FIG. 6B is identical to image 610 in FIG. 6A except that the largest face (662 in FIGS. 6B and 612 in FIG. 6A) exhibits blinked eyes and a negative expression. Each face carries a weight or fitness value. Faces with weights less than a percentage of the highest scoring face are ignored, for example, faces less than 25% of the highest scoring face. Factors such as eye blink and expression will lower the fitness score of 662 in FIG. 6B. Similarly, factors such as direction of eye gaze, head pitch, head yaw, head roll, exposure, contrast, noise, and occlusions can similarly lower the fitness score of a face. Padded face box 682 in FIG. 6B has a corresponding low fitness score. In image 670, it is assumed the fitness score of face 662 was so low that it is ignored from any further processing. In this case, padded faces 661 and 663 form padded face boxes 695 and 696 that are not overlapping. Image 690 then has three medium priority regions, labeled 695, 696, and 697 (medium priority regions 684 and 685 were grouped together to form combined medium priority region 697).

2.2 Formation of Low Priority Region

Expanding from the medium priority region to the low priority region will now be described. This algorithm follows an extension of what photographers call the "rule of thirds". Using the size and location of a medium priority region, the algorithm determines if a rule of thirds composition can be applied to make a more pleasing display. The rule-of-thirds is a compositional rule that has proven to yield well balanced or natural looking prints in the averaged opinions of surveyed observers. If an image is broken into an equally spaced 3×3 grid with two horizontal and two vertical lines, the aesthetic design idea is to place the subject of interest (the medium face box in this example) on one of the four dividing lines, preferably at one of the four intersecting points. In this example, the algorithm attempts to center the medium priority region on one of the four dividing lines. The size of the medium priority region and the spacing of the rule of thirds lines determines the low priority region according to the following methods.

Often, is not possible to center the medium priority region on one of these lines without a portion of the medium priority region falling outside the imageable area. If we cannot center our medium priority region on one of these dividing lines, and if the entire medium priority region is in the upper half of the image, the algorithm tries to expand the medium priority region downward. Similarly, if the entire medium priority region is in the lower half, or left half, or right half, the algorithm tries to expand the medium priority region upward, to the right, or to the left, respectively, in an attempt to make the resulting composition more pleasing. The amount of expansion is an adjustable parameter, strongly influenced according to whether the desired output is landscape or portrait. When an output aspect ratio is specified, the up-down expansion is emphasized in portrait outputs, and left-right expansion is emphasized in landscape outputs. For example, if the output image display image is portrait in nature, the algorithm will favor expanding the crop box in the vertical direction. If the output image display image is landscape in nature, the algorithm will favor expanding the crop box in the horizontal direction.

As an example result of the algorithm, if the medium priority region is in the upper right quadrangle, the low priority region is initialized as being equal to the medium priority region. Then, for landscape output images, the left side is extended by twice the largest face width and the bottom is extended by twice the largest face width to form the low priority region. For portrait images, neither the left or right side is extended, but the bottom is extended by three times the largest face width. Similar rules are used if the medium priority region is in the upper left quadrangle. If the medium priority region is in the lower left or right quadrangle and a landscape image is requested, the right and left sides respectively are extended by twice the largest face width and the upper boundary is extended by the 1× the largest face with to form the low priority region. If the medium priority region is in the lower left or right quadrangle and a portrait image is requested, the right and left sides are not extended but the upper boundary is extended by the 1× the largest face width to form the low priority region. If the medium priority region is constrained to the left or right half of the input image, we form the low priority region by expanding to the right or left by 2× the largest face width. If the medium priority region is in the lower center of the input image, the low priority region is formed by expanding upward by 1× the largest face width. If the medium priority region is in the upper center half of the input image, the low priority region is formed by expanding downward by twice the largest face width for landscape images and three times the largest face width for portrait images. When there are multiple medium priority regions, a weighted combination is used to gauge the overall location of the medium priority region. This weighted combination can be based upon size, location and, as will be seen shortly, includes information about the fitness of the faces in each medium priority region.

In addition to using the above composition rules, the present algorithm includes a parameter that indicates if the input image was composed by an expert or by an amateur. If the algorithm determines that previous modification to a digital image was composed by an expert, the resultant changes to the low priority region in the digital image performed by the algorithm are biased towards the original input image boundaries. If the algorithm determines that previous modification to a digital image was composed by an amateur, the resultant change to low priority region in the digital image performed by the algorithm is not constrained (standard default mode). For example, if the (expert) photographer modified the digital image by placing the subject off center, the output image would retain a similar bias. To implement this, the algorithm can continuously adjust between using the full, automatically generated low priority region, and the original user modified image. In this method, the final four boundaries are a weighted sum between the two. The default mode weights the automatically generated low priority region boundaries to 1 and the original boundaries to 0. For expert mode, the algorithm uses weights of 0.5 for both the algorithm determined low priority region and the previously modified image boundaries.

3.0 Formation of Constrained Aspect Ratio Crop Box

The resulting low priority region (expanded medium priority region) defines the optimal viewable area of the input image under this algorithm. Areas of the input image outside this box are considered irrelevant portions of the input image and the algorithm ignores content in these areas. When no output aspect ratio is specified, or when the requested aspect ratio matches the low priority region aspect ratio, the area in the low priority region becomes the final output image. In cases where the output aspect ratio is specified and does not match this low priority region aspect ratio, preferred embodiments of the present invention serve to rectify the difference, as follows.

To rectify the difference, the constraining dimension is computed. In cases where the requested output aspect ratio is greater than the low priority region, the algorithm attempts to pad the low priority region left and right with the previously determined "irrelevant" portions of the input image. Similarly, in cases where the output aspect ratio is less than the low priority region, the algorithm attempts to pad the top and bottom with the "irrelevant" portions of the input image. The choices of expanding to the low priority region, rectifying aspect ratio mismatches, and padding choices are accomplished though a successive series of evaluations of low, medium, and high-priority regions.

When attempting to achieve the requested aspect ratio, there may not be enough irrelevant area to use as padding on the top or sides of the low priority region to achieve the requested aspect ratio. In this case, the edges of the image can be padded with non-content borders, the low priority region can be cropped, or we can use external image information to extend the original image in the required direction. Padding with non-content borders is not always visually appealing. Extending the original image content from other images in the user's collection or from images on the web requires sophisticated scene matching and stitching. Selectively cutting into the low priority region is often the preferred method but should be performed in a manner such that a visually aesthetically appealing cropped version of the low priority region is maintained. This is accomplished by center cropping on the low priority region as long as doing this does not delete any of the medium priority region. If any of the medium priority region would be cropped by this process, this may be avoided by centering the output image on the medium priority region. If this shift does not crop the high priority region, the result is considered satisfactory. If any of the high priority region would be cropped by this process, the output image is centered on the high priority region. If this high priority region is nonetheless clipped, once again the image can be padded with borders such that none of the high priority region is cropped out of the final image, or portions of the high priority region can be cropped as a last resort.

FIG. 7 shows an input digital image 710. The face boxes are shown in 720. Using face padding rules, that are governed by face size, location, and aspect ratio as explained above, the medium priority region that encompasses the padded face box areas is shown in 730 as the combined padded face box area. This medium priority region is then expanded for pleasing composition forming a low priority region as shown at 740 and 750. The expansion direction and amount is dictated by the location and size of the medium priority region as well as the requested output aspect ratio. In image 740, both detected face boxes are in the upper left quadrant and the requested output aspect ratio is a landscape format. As such, the cropping algorithm will expand the medium priority region toward the bottom and the right to form the low priority region. As explained above, had the face boxes been present in the upper right quadrant, the cropping algorithm would have been biased to expand the combined padded area to form the low priority region to the bottom and to the left. If facial pose or eye gaze is enabled, the algorithm computes vectors indicating the orientation for each face in the image. The average direction of the vectors is used to bias the low priority region formation in the direction, or average direction, in which the faces are looking. If a landscape image is desired as an output format, decision box 760 results in expanding the medium priority region downward and to the right as in image 740. If a portrait image is desired, decision box 760 results in expanding the medium priority region downward as in image 750. The resulting low priority region would be considered the optimal pleasing composition of the input image if there were no output aspect ratio constraints. If there are no output aspect ratio constraints, the low priority region defines the final image.

When there are specific output aspect ratio constraints, for example, a requested output format, then the algorithm rectifies any differences between the low priority region and the output aspect ratio constraints to form a constrained aspect ratio crop box. In general, content in the low priority region is not sacrificed, if possible. As such, the cropping algorithm will form a constrained aspect ratio crop box inside the low priority region equivalent to the specific requested output aspect ratio constraint and keep growing this crop box until it fully envelops the low priority region. Unless the requested output aspect ratio matches the low priority region, irrelevant portions of the input image will be included in the constrained aspect ratio output image either to the left and right of the low priority region, or to the top and bottom. As the input image irrelevant portions allow, the constrained aspect ratio crop box is centered on the low priority region. However, if an image boundary at the top, bottom, left, or right side of the input image is included in this centered low priority region, the algorithm allows the crop box to expand at the opposite side without constraint so that only the original image content is included in the final image. This allows the algorithm to avoid sacrificing pixels inside the low priority region and uses an original image boundary as one of the final image boundaries, as it forms the final output aspect ratio image.

For workflows in which a user has multiple input images that need to be inserted into multiple template openings of varying aspect ratios, the low priority region aspect ratio becomes a key indicator of which images fit best into which template opening to accomplish the goal of fully automatic image template fulfillment. The low priority region aspect ratio is compared to all template opening aspect ratios. The more similar the two aspect ratios, the better the fit.

FIG. 8 illustrates example output images, starting with image 710 having aspect ratio 6:4 as input, when a landscape output aspect ratio is requested, as in image 810, and when a portrait output aspect ratio is requested, as in image 820. In both images, the detected face boxes 811, 812, and the medium priority region, 815, 825, are the same. The low priority region, 816, 826, and the final output image with constrained output aspect ratio, 817, 827 are also shown. In 817, the algorithm was able to keep expanding to satisfy the final requested constrained output aspect ratio box until its top and bottom borders matched the top and bottom borders of the low priority region, as explained above. In 827, the algorithm was also able to keep expanding to satisfy the final constrained output aspect ratio box until its left and right borders matched the left and right borders of the low priority region, as explained above.

In both images 810 and 820, the algorithm fit the final constrained output aspect ratio box as tightly around the low priority region as possible. In some cases this may cause too much zoom in the image. For example, we can continue to expand the final constrained output aspect ratio box in 810 and 820 until we hit a border of the image. Specifically, a user adjustable parameter is added to the algorithm such that this border can be as tight as possible to the low priority region, or as tight as possible to one of the image borders, or anywhere in between. This is the same algorithm as using the amateur (default) vs. professional cropping mode discussed earlier. In fact, if an informed estimate can be made about how much cropping the user would prefer, this parameter can be adjusted on the fly automatically. For example, if all images in a user's collection, except the current image, are 4:3 aspect ratio, it may indicate that the user went out of his way to change the current image aspect ratio. The user either already performed manual cropping, or used another offline procedure to manually or automatically change the aspect ratio in the current image. Either way, the algorithm detects this and is biased in the expert direction and so the algorithm will selectively fit the final constrained output aspect ratio box as tightly to the image border as possible. Another way to automatically set this aggressiveness parameter is to look at the aspect ratio variance of all images in a user's collection. Higher variances mean the user is using different cameras, different shooting modes, switching between portrait and landscape, and/or manually cropping images. As such, the higher the variance, the greater the bias towards expert mode; similarly, the lower the variance, the greater the bias towards amateur (default) mode. Similarly, by presenting side-by-side images to a user representing cropped results as obtained from centering and rule-of-thirds cropping, a user's preference for a particular cropping algorithm may be obtained, stored, and used accordingly.

In both example images 810 and 820, the algorithm was able to expand from the low priority region to the final constrained output aspect ratio box while remaining within the image area. Had the requirement been to form a more extreme landscape or portrait output image aspect ratio, the process of fitting the constrained output aspect ratio crop box could have resulted in either padding the output image with homogeneous non-content borders, sacrificing pixels inside the low priority region, or extending the original image by using additional image sources.

FIG. 9 illustrates an example wherein the requested output aspect ratio is 16:9. Starting image 910 is the same as images 810 and 820. In particular, two padding options are provided at decision box 940 as shown by images 920 and 930. The algorithm, as described above, will branch to generate image 920 if it is disallowed to remove pixels from the low priority region 916. Often, the low priority region can be made more pleasing by incorporating the image into a template or matte border yielding pleasing results. In cases when this is not possible, the edges of the image are padded with non-content borders (in the left and right borders in this case). This can be undesirable in some instances, and so it is necessary to omit pixels from the low priority region as shown in the algorithm branching to generate image 930.

If the input image 910 was part of a collection of images or if the image had GPS information associated with it, we do have a third option not shown in FIG. 9. We could use scene matching, modeling camera intrinsic and extrinsic parameters, and bundle adjustment or similar techniques to find other images taken at the same locale. For example, if we had a portrait image of two people standing in front of the Statue of Liberty, and we wanted to make a 16×9 constrained aspect ratio print, we typically would have to zoom in quite a bit, losing perhaps valuable information from the top and bottom of the original image. Using techniques described by Noah Snavely, Rahul Garg, Steven M. Seitz, and Richard Szeliski, "Finding Paths Through the World's Photos," SIGGRAPH 2008, which is incorporated herein by reference in its entirety, we could not only find other images taken at the same location, but we could seamlessly blend in information to the left and right of the original image such that the final 16×9 constrained aspect ratio image could contain the full top and bottom of the Statue of Liberty.

When it is necessary to crop pixels from the low priority region 916, the following algorithm is performed, with reference to FIG. 10, in which an input image of 6:4 aspect ratio is recomposed to a requested output aspect ratio of 25:10. This algorithm is equally applicable to generate image 930 which illustrates a 16:9 aspect ratio.

1) The constrained aspect ratio crop region, which is the requested output aspect ratio of 25:10, is digitally centered on the low priority region 1016 such that the constraining dimension extends from one end of the input image to the other (left and right input image borders in 1020), and the center of the cropped dimension (vertical) overlaps the center of the low priority region (1020 is generated from a vertically centered crop of low priority region 1016 while maintaining the requested output aspect ratio). If no pixels from the low priority region 1016 are cropped out, cropping is complete. Otherwise, go to step 2) to restart the procedure using the medium priority region. Image 1020 shows a sample cropping, vertically centered on 1016. Because pixels were cropped from low priority region 1016, we continue with step 2).

2) The constrained aspect ratio crop region is recentered on the medium priority region 1015. If no pixels from the medium priority region are cropped out after performing the same procedure as on the low priority region described above in step 1), cropping is complete. Otherwise, go to step 3). 1030 shows a sample cropping, vertically centered on the medium priority region 1015. Because pixels were cropped from the medium priority region 1015, we continue to step 3) to restart the procedure using the high priority region.

3) Rather than proceeding with the steps as described above and centering on the high priority region, empirical testing has found that centering on a point slightly above a centroid of the high priority region yields preferable results. Therefore, a centroid of the constrained aspect ratio crop region is identified and is situated on (overlaps) a point slightly above the centroid of the high priority region. This point is located 40% of the total vertical height of the high priority region measured from the top of the high priority region. 1040 shows a sample cropping, using this 40/60 method.

4.0 Arbitration of Facial Regions

If Step 3) crops out any pixels from the high priority region and we had previously determined we had multiple medium priority regions (as demonstrated by 645 and 647 in FIG. 6A), a face arbitration step ensues. Face arbitration takes place at the medium priority region, the high priority region, and at the individual face box level. If there is more than one medium priority region, we first selectively ignore the smallest medium priority region, but retain its corresponding high priority region(s). If ignoring this smallest medium priority region allows all high priority regions to fit in the final cropped image defined by the 25:10 aspect ratio output in this example, cropping is complete. Else, we first additionally ignore the high priority region corresponding to the just ignored smallest medium priority region, and then ignore the second smallest medium priority region. This process continues until all remaining high priority regions fit and are recognized in the final cropped image at the requested aspect ratio, or until we have only one medium priority region remaining that is not ignored.

The order in which medium priority regions are ignored, in situations where there are multiple ones of these areas, can be controlled according to the size and location of such areas. A score is given to each medium priority region, wherein lower scoring areas are ignored first. Once such an area is ignored it means that the algorithm no longer recognizes the medium priority region. The larger the area the higher its score and the more central the area the higher its score. Formally, the medium priority region score is given by: (its area+area of input image)+(0.5×location of combined padded area). The first term yields a size indicator that varies between 0 and 1. The second term, or padded area location is calculated by computing the distance between the centroid of the combined padded area and the centroid of the input image, then dividing this by half of the minimum of the width or height of the input image. This yields a value for the second term which also varies continuously between 0 and 1. Size has been deemed more important than location, and so is weighted twice as much by this formula. Lowest scoring medium priority regions are ignored first. It should be evident to those skilled in the art how to expand the above formulas to include other variants such as non-linear center to edge location and non-linear medium priority region size. A centroid of a region is a point defined as the vertical midpoint and horizontal midpoint of the region, using as reference the furthest top, bottom, right and left points contained in the region.

If only one medium priority region remains, and the entire high priority region cannot fit into the final cropped image, then arbitration at the high priority (face box) level is performed. Arbitration at the high priority region level is invoked when there is only one medium priority region and the constrained aspect ratio crop removes pixels from the high priority region. Similar to arbitration at the combined padded area, we now rank individual face boxes, and start ignoring one face box at a time until all pixels in the resulting highest priority region are included in the constrained aspect ratio crop box. Individual face boxes are once again weighted according to size, location, eye blink, gaze, facial expression, exposure, contrast, noise, and sharpness. As face arbitration eliminates faces, or in more general, as face regions or padded face regions are ignored to adhere to constrained aspect ratio, the algorithm preferentially biases crop boundaries away from the ignored areas to minimize occurrences of half of a face at the edge of the final constrained aspect ratio image.

Adding facial pose, eye blink, expression, exposure, noise, and sharpness into this scoring mechanism is more compute intensive, but yields more pleasing results. In FIG. 6B, a low eye blink and expression score at the individual face level caused face 662 to be ignored from further processing. With respect to the medium priority region (combined padded face boxes), each eye blink or sideways eye gaze multiplies the cumulative combined medium priority region score by (1−1/ n), where n is the number of faces in the medium priority region. So, if there were two faces in the medium priority region, and one person was blinking, the score gets cut in half. If there were four faces, and one was blinking and another looking off to the side, we multiply the medium priority region score by $(3/4)(3/4)=9/16$. Facial expression can either increase or decrease a padded face box score. Neutral faces have no effect, or a multiplier of 1. Preferred expressions (happy, excited, etc) increase the box score with a multiplier above 1, and negative or undesirable expressions decrease the overall score with a multiplier less than 1. These weights can be easily programmed into the present algorithm. Facial expressions are a little more forgiving than eye blink or eye gaze, but, overly sad, angry, fearful, or disgusted faces are ranked low; while happy and surprised faces are ranked higher. Each face is assigned an expression value from 0.5 which is maximum negative to 1.5 which is maximum positive. The expression values are then scaled by face size such that larger faces have more weight, and the weighted average is used as an expression multiplier for the entire medium priority region. Exposure, contrast, noise, and sharpness indicators similarly decrease the weight of the padded face box if the face is too dark/light, high/low contrast, too noisy, and too blurry respectively. It should be obvious to those skilled in the art that these assignments of value to multipliers are arbitrary and can be made more complex, and non-linear rules can also be devised.

It is also possible to expand face arbitration to include known clustering relationships amongst people as per A. Gallagher, T. Chen, "Using Context to Recognize People in Consumer Images", *IPSJ Transactions on Computer Vision and Applications,* 2009. In this case, if we find face boxes in the upper portion of the image with one or more smaller face boxes below them, we can often infer that the two upper faces are the parents and the lower faces are the children. Similarly, if we find an upper face and then a lower face with a tilted pose, it is often a child or baby being held by a parent. As such, if the entire high priority region cannot fit into the final cropped image, we can break the single high priority regions into multiple smaller face boxes (padded or not) based upon known parent-child, parent-infant, and adult couple relationships. Similarly, prior knowledge of culture, community, and religion can be invoked. Further, segregation can be done by age, gender, identity, facial hair, glasses, hair type, hat, jewelry, makeup, tattoos, scars, or any other distinguishing characteristics. Using clothing detection techniques such as described in A. Gallagher, T. Chen, "Clothing Cosegmentation for Recognizing People," IEEE Conference on Computer Vision and Pattern Recognition, 2008, which is incorporated herein by reference in its entirety, individual regions in a digital image can be segmented further by neckwear, clothing, or uniforms.

5.0 Softcopy Viewing of Crop Regions

An alternative implementation of the present invention includes using the algorithm for generating motion images in softcopy devices, such as digital frames, TV's, computerized slide shows, or the like, wherein several crop variations from one single digital image can be output. For example, it is a simple matter to program an automatic display sequence wherein we start with displaying the low priority region of an image, then, in a continuous motion display, zooming in to its medium priority region, then zooming into its high priority region, and finally panning to each face box in the image one at a time. Clusters discovered either by face box size and pose, or by age, race, or gender recognition, or a combination thereof, can be zoomed into, such as just the parents, or if the daughters are on one side, zooming in to just the daughters, all as a continuous motion image. This kind of display has been referred to in the art as the "Ken Burns effect."

6.0 Padding Rules Used for Medium Priority Regions

Methods of forming the individual padded face boxes 631-635 in FIG. 6A, or more specifically, the individual padding around each face box used in the construction of the medium priority regions 645 and 647 in FIG. 6A will now be described. For example, although face detection returns the size and location of all faces, 611-615 in FIG. 6A, it has not been explained how to determine the size and location of the corresponding padded face boxes, 631-635 in FIG. 6A. Typically, each padded face box 631-635 is centered on and is slightly larger than the face box 611-615 itself, but there are several mechanisms which control this padding, including different padding amounts to the left, right, top, and bottom of each face box. To aid this description, we introduce a unit of measure called FaceWidth, where one FaceWidth is the larger of the width or height of the face box returned from the face detection facility. We also introduce a variable called MinWidthHeight, which is the smaller of the input image's height or width.

Figure 11:
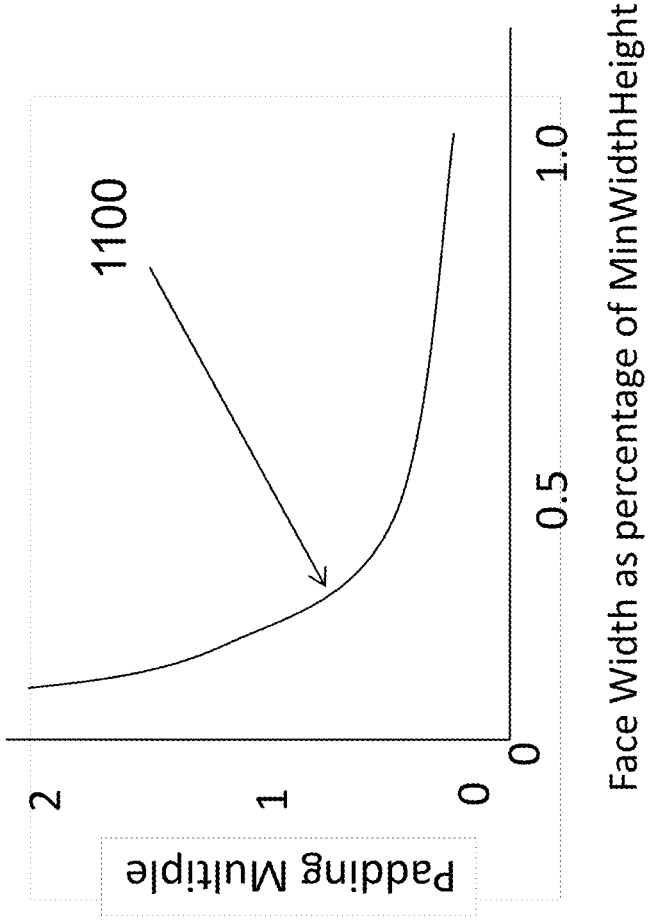
FIG. 11 illustrates a padding function according to an embodiment of the present invention.
Figure 12:
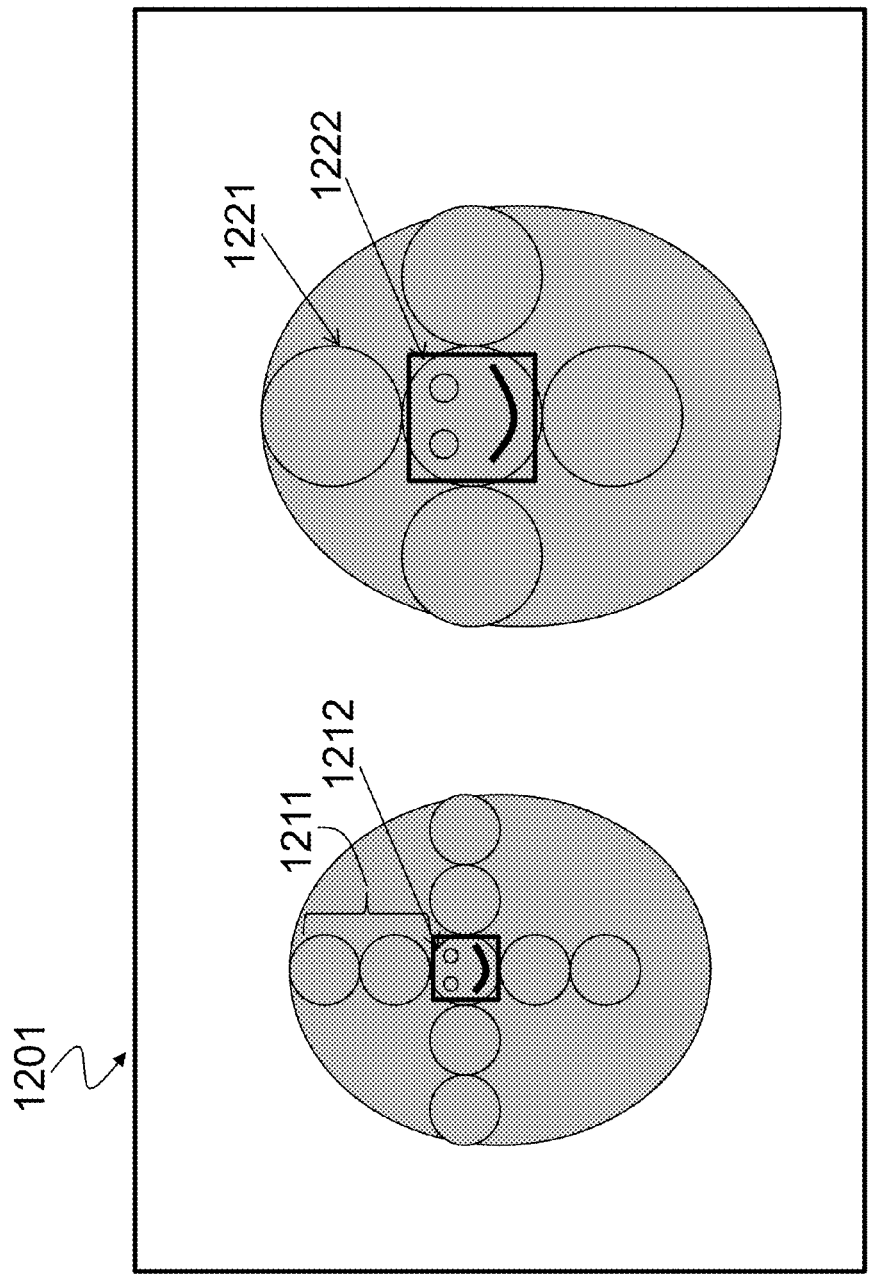
FIG. 12 illustrates a padding example according to an embodiment of the present invention.
Figure 13:
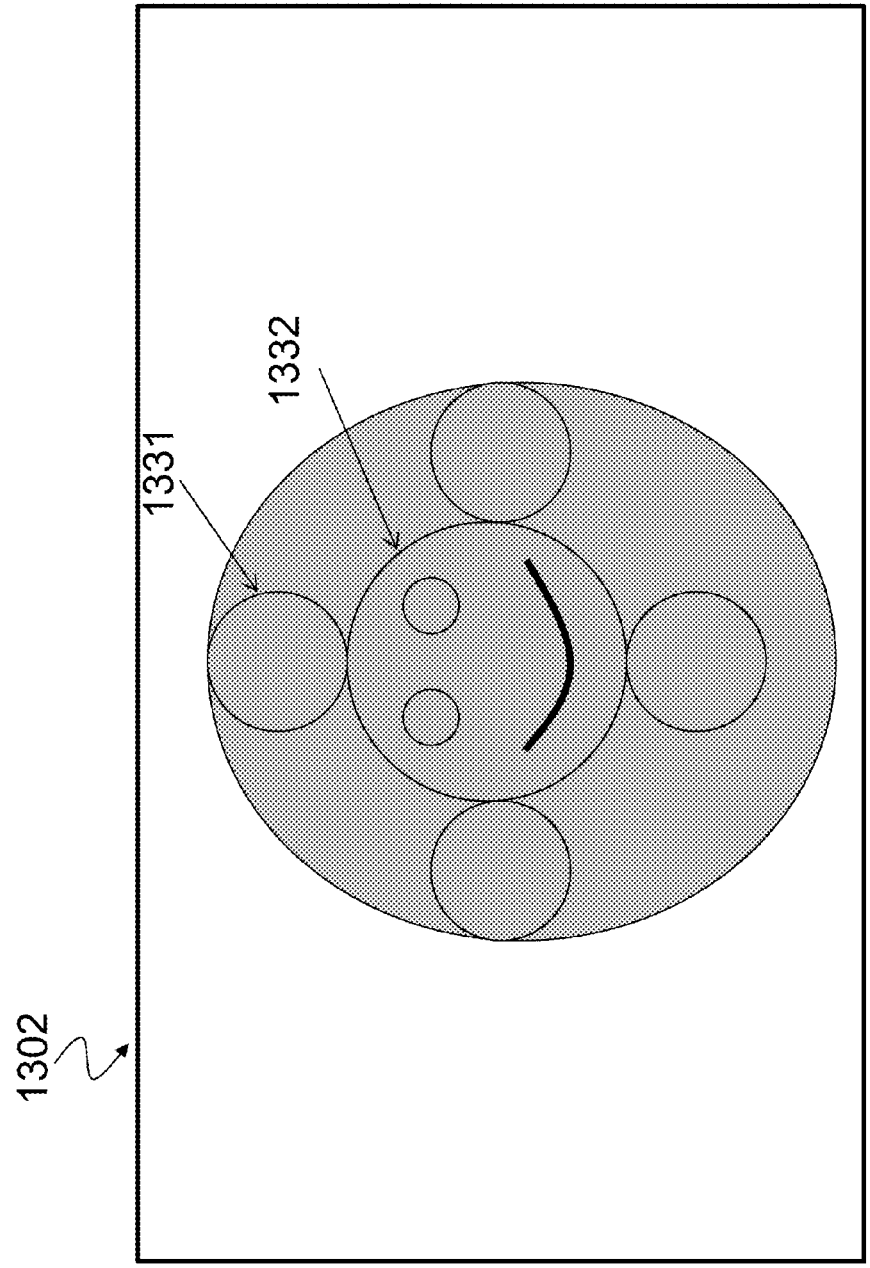
FIG. 13 illustrates a padding example according to an embodiment of the present invention.
Figure 14:
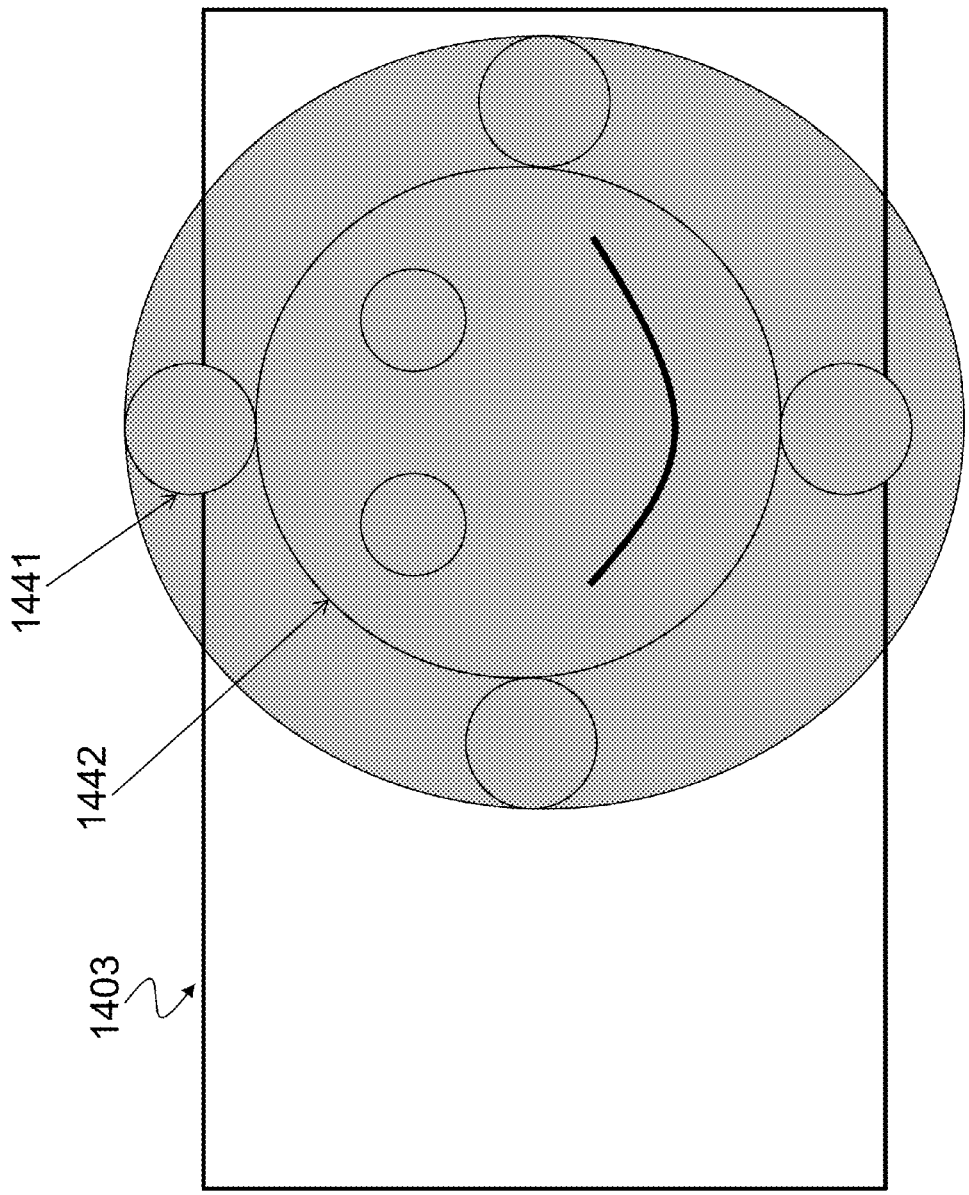
FIG. 14 illustrates a padding example according to an embodiment of the present invention.

The first mechanism that controls the padded face box size is the relationship between FaceWidth and MinWidthHeight. Smaller face boxes get larger padding. Larger face boxes get less padding. This is a non-linear relationship, 1100, as shown in FIG. 11. A FaceWidth less than or equal to 10% of the MinWidthHeight of the input image 1201, such as face 1212, get the maximum padding 1211 of 2× FaceWidth on sides and top of face. Faces 20% of MinWidthHeight, such as 1222, get approximately 1× FaceWidth padding 1221, on sides and top of the face. Faces 40% of MinWidthHeight such as 1332 (face box not shown), get approximately ½× FaceWidth padding 1331 on sides and top of the face. Faces greater than or equal to 80% MinWidthHeight such as 1442 (face box not shown), get approximately ¼× FaceWidth padding 1441 on sides and top of the face. These padding amounts are easily generally derivable from the graph shown in FIG. 11, are easily adjustable according to user preference, and can be selected and stored in a computer system for access by a program that implements the algorithm.

Figure 15:
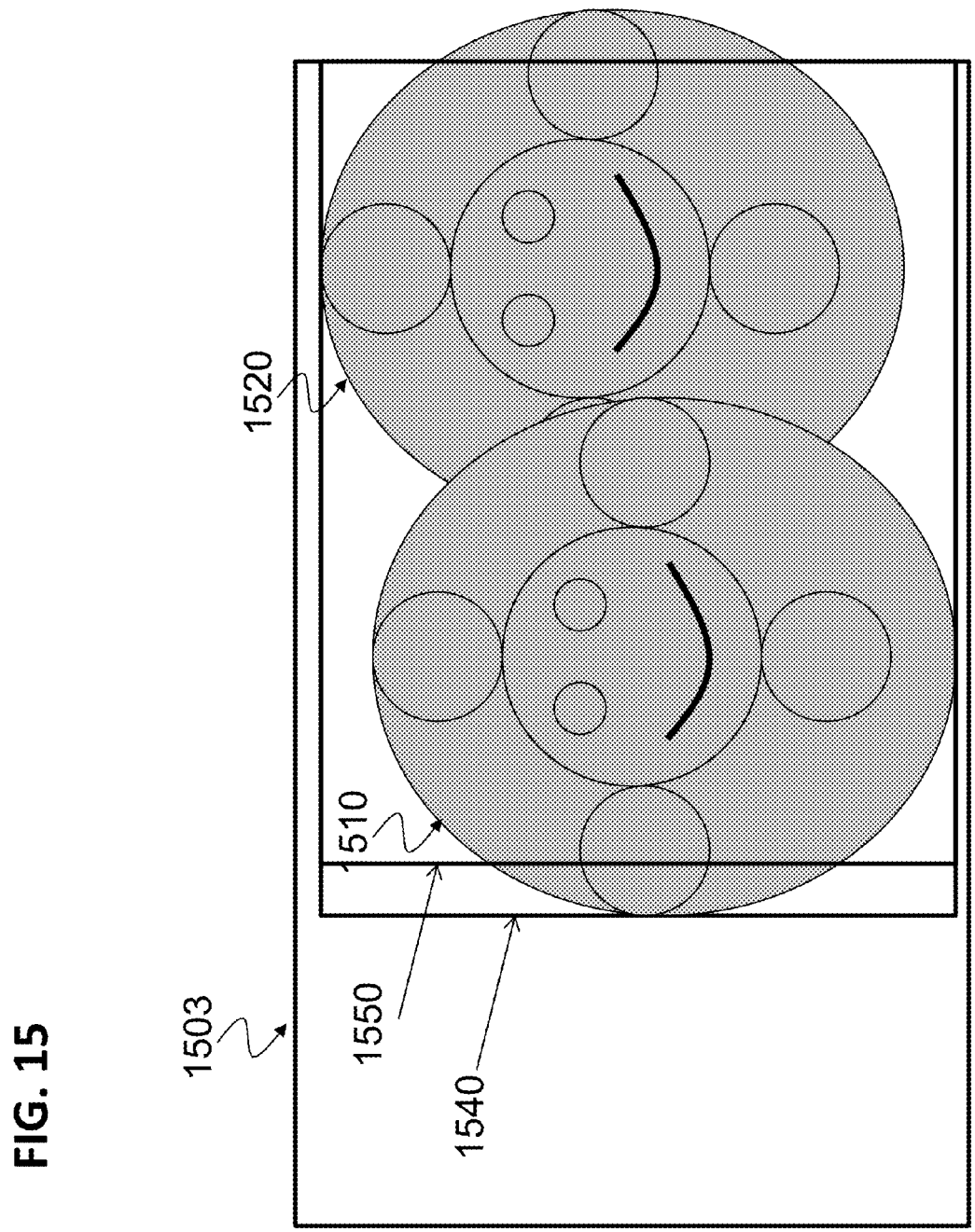
FIG. 15 illustrates a padding example according to an embodiment of the present invention.

As we are padding faces, we keep track if any of the padded sides in a medium priority region extend beyond the image boundary because one face is too close to the edge of the digital image. If this happens, symmetric clipping is automatically performed on the opposite end of that particular medium priority region, making the medium priority region symmetric as shown in FIG. 15. The left side of the medium priority region 1540 is clipped 1550 by the same amount that the right edge of the padded face area 1520 extends beyond the input image 1503 boundary, so symmetric cropping is performed on the left 1510 and right 1520 padded face boxes (boxes not shown).

Figure 16:
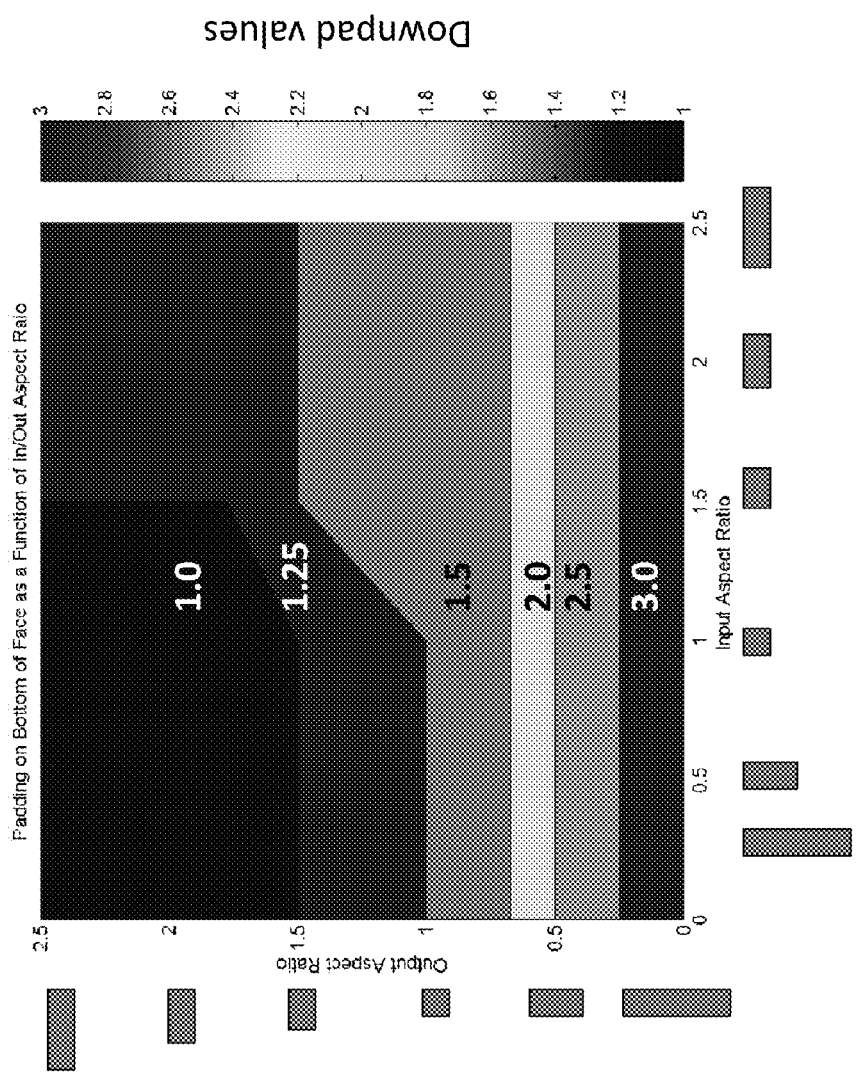
FIG. 16 illustrates a bottom padding function according to an embodiment of the present invention.

The padding below the face box (downward pad) is regulated by the given input image aspect ratio to desired output aspect ratio as well as face box size. The initial padding below the face is determined by the input to output aspect ratios. This is a non-linear 2-D relationship as shown in FIG. 16. Small output aspect ratios correspond to portrait images, while large aspect ratios correspond to landscape images. The mapping function in FIG. 16 generally provides more downward padding in portrait shots, and less downward padding in landscape shots. It should be noted that the algorithm is least aggressive on input images (horizontal axis) which are extreme portrait and whose output format (vertical axis) is an extreme landscape aspect ratio. This is reflected in the upper left region of the mapping in FIG. 16 where the multiple value of 1.0 is lowest. FIG. 16 is a sample 2-D mapping, and those skilled in the art will understand that any nonlinear relationship can be substituted.

Figure 17:
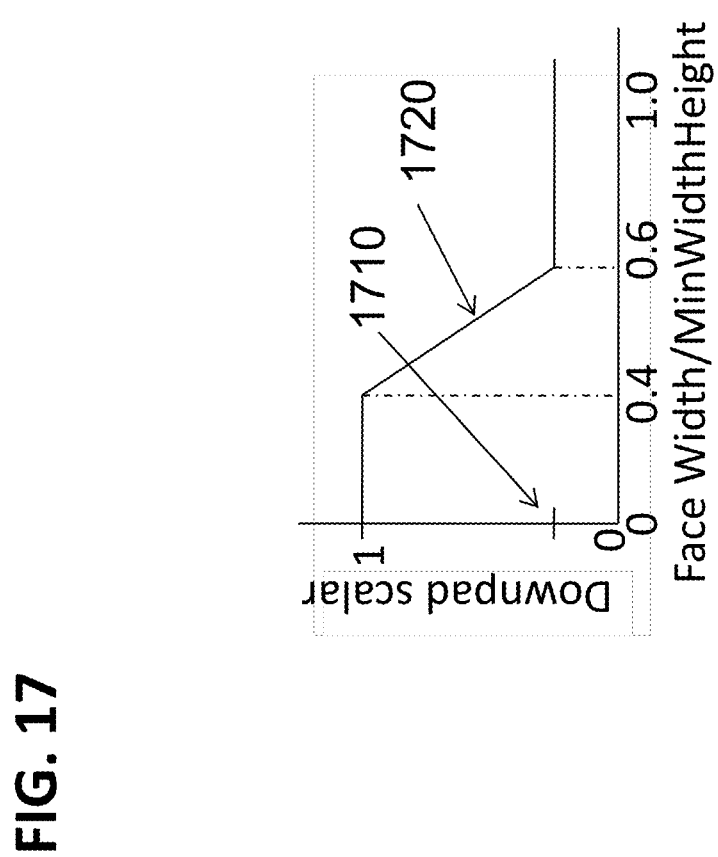
FIG. 17 illustrates a bottom padding function according to an embodiment of the present invention.
Figure 18:
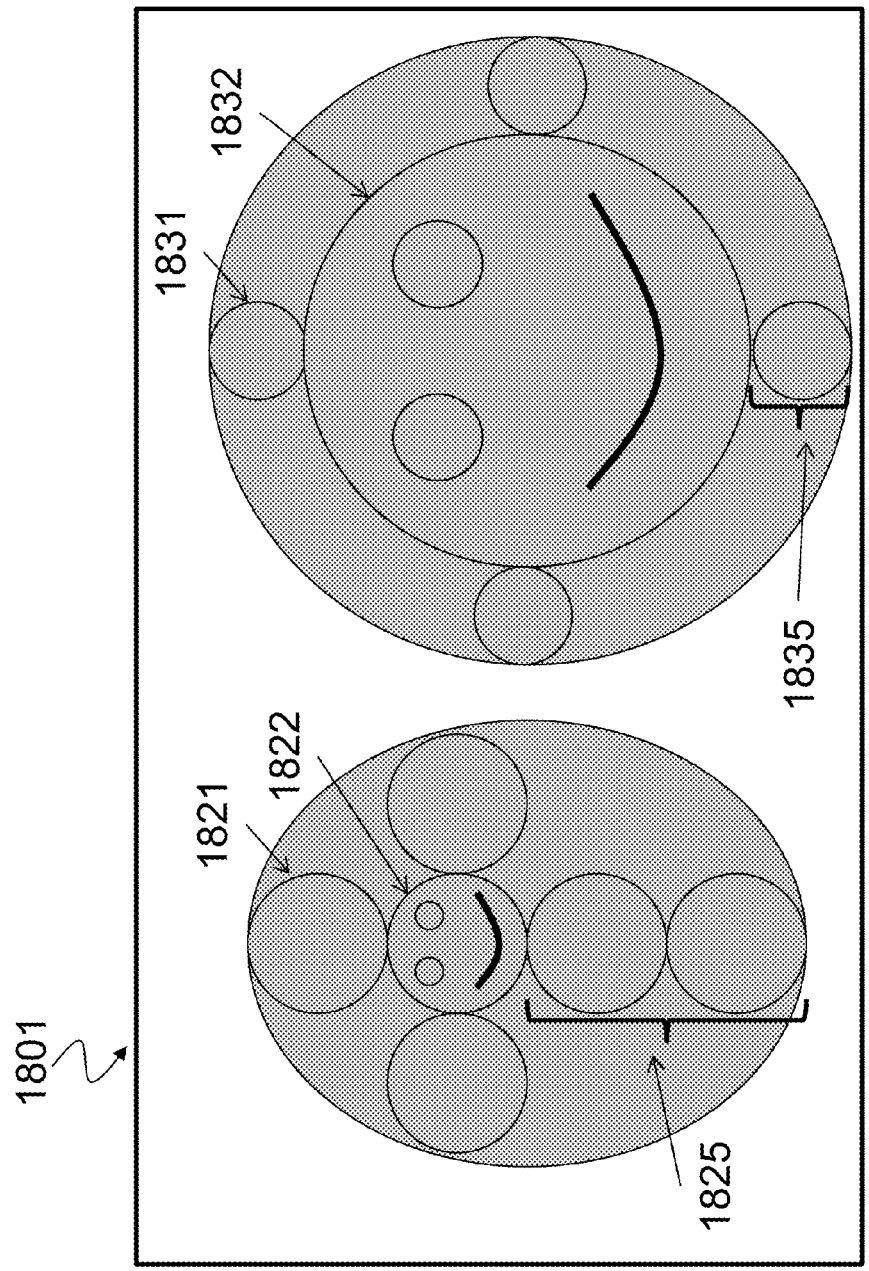
FIG. 18 illustrates an example of a bottom padding function according to an embodiment of the present invention.

With the initial downward pad generated by input to output aspect ratio as shown in FIG. 16, we now dampen the downward pad by face size. Larger faces get more symmetric padding all around the face. Smaller faces get the requested downward padding, with smaller dampening or without dampening, as determined by aspect ratio. FIG. 17 shows a sample nonlinear function 1720 that maps from 1.0 down to 1/downpad, where downpad is the downward padding as determined by the input to output aspect ratio as shown in FIG. 16. This function is a piecewise linear function in which face boxes having a width less than or equal to 40% of MinWidthHeight use the full face pad (1× scalar) and faces greater than or equal to 60% MinWidthHeight have equal padding all around the face, i.e. maximum dampening which results in no extra downward padding. All other faces are linearly interpolated between these two points. FIG. 18 shows sample faces 1822 and 1832, who's face box (not shown) size is relative to the height of input image boundary 1801, with top and side pad sizes represented by 1821 and 1831 and demonstrate the face-size-variable downpad factor 1825 and 1835, respectively.

The algorithms described herein are all quite fast to compute on modern computer systems, whether workstation or hand held devices. In fact, the running time is limited only by the face detection or facial feature extraction time. Empirical studies have shown that the methods described herein outperform simpler face (size and location) based cropping methods as well as more sophisticated main subject detection methods—even main subject detection methods that include face detection. For still imagery, the algorithm recommended cropping is automatically output, while, for video, the algorithm can automatically output a smooth transitioning motion image from tightly cropped faces (high priority region), to loosely cropped faces (medium priority region), to ideally composed images (low priority region), and back again, or include panning between any regions having any priority level. Further, not only can the video pan from one face to the next, but if clusters of faces are found, the video can automatically pan from one region to the next with no user interaction. Finally, the automatically generated low, medium, and high priority crop regions, along with face box regions and final constrained output aspect ratio crop boxes can be saved back to the file as meta-data, or saved to databases for subsequent usage.

Alternative Embodiments

Although the methods described herein are done so with respect to human faces, it should be obvious that these methods can be expanded to include any particular object of interest. For example, instead of human faces, we can extract regions based upon human body or human torso as described in Ramanan, D., Forsyth, D. A. "Finding and Tracking People From the Bottom Up," CVPR 2003, which is incorporated herein by reference in its entirety. Similarly, using identical techniques used to train human face detectors as described by Burghardt, T. Calic, J., "Analysing Animal Behavior in Wildlife Videos Using Face Detection and Tracking," Vision, Image and Signal Processing, 2006, which is incorporated herein by reference in its entirety, we can train to find animals of any sort, including pet dogs, cats, or even fish; or train on bacterium, viruses, or internal organs; or trained to find cars, military vehicles, or parts off an assembly line. Further, with the introduction of depth cameras such as Microsoft's Kinect and silhouette extraction techniques such as described in Shotton, Jamie et. al. "Real-Time Human Pose Recognition in Parts from Single Depth Images," CVPR 2011, which is incorporated herein by reference in its entirety, it is common to find and track humans in real-time and such humans can be segmented by depth, pose, or gesture.

It will be understood that, although specific embodiments of the invention have been described herein for purposes of illustration and explained in detail with particular reference to certain preferred embodiments thereof, numerous modifications and all sorts of variations may be made and can be effected within the spirit of the invention and without departing from the scope of the invention. Accordingly, the scope of protection of this invention is limited only by the following claims and their equivalents.

PARTS LIST

| | |
|---|---|
| 101 | Remote System |
| 102 | Remote Control |
| 103 | Mouse |
| 104 | Keyboard |
| 105 | Bus |
| 106 | Remote Output |
| 107 | Sensors |
| 108 | Image Sensor |
| 109 | Storage/Memory |
| 110 | HDD |
| 111 | Drive |
| 112 | Removable Device |
| 113 | Interface |
| 114 | Slot |
| 115 | Communication System |
| 116 | Processor/CPU System |
| 117 | Local Output |
| 118 | Mouse |
| 119 | Keyboard |
| 121 | I/O Devices |
| 122 | Scanner |
| 123 | Printer |
| 124 | I/O Device |
| 125 | Housing |
| 200 | Workstation/PC |
| 201 | Control/Editing Area |
| 202 | User |
| 209 | Storage/Memory |
| 217 | Local Output |
| 218 | Mouse |
| 219 | Keyboard |
| 220 | Audio Sensor |
| 221 | Image Sensor |
| 222 | Sensor System |
| 310 | Image |
| 320 | Image |
| 321 | Crop Border |
| 322 | Crop Border |
| 326 | Face Box |
| 327 | Face Box |
| 330 | Image |
| 340 | Image |
| 341 | Crop Border |
| 342 | Crop Border |
| 346 | Face Box |
| 347 | Face Box |
| 350 | Image |
| 410 | Image |
| 430 | Image |
| 435 | Image |
| 450 | Image |
| 455 | Image |
| 510 | Image |
| 520 | Image |
| 521 | Face Box |
| 522 | Face Box |
| 523 | Face Box |

-continued

| | |
|---|---|
| 524 | Face Box |
| 525 | Face Box |
| 530 | Image |
| 535 | Combined Face Box |
| 540 | Image |
| 541 | Padded Face Box |
| 542 | Padded Face Box |
| 543 | Padded Face Box |
| 550 | Image |
| 555 | Combined Padded Face Box |
| 560 | Image |
| 565 | Combined Padded Face Box |
| 567 | Expanded Combined Padded Face Box |
| 610 | Image |
| 611 | Face Box |
| 612 | Face Box |
| 613 | Face Box |
| 614 | Face Box |
| 615 | Face Box |
| 618 | Combined Face Box |
| 620 | Image |
| 625 | Combined Face Box |
| 627 | Combined Face Box |
| 630 | Image |
| 631 | Padded Face Box |
| 632 | Padded Face Box |
| 633 | Padded Face Box |
| 634 | Padded Face Box |
| 635 | Padded Face Box |
| 640 | Image |
| 641 | Crop Border |
| 645 | Combined Padded Face Box |
| 647 | Combined Padded Face Box |
| 660 | Image |
| 661 | Face Box |
| 662 | Face Box |
| 663 | Face Box |
| 664 | Face Box |
| 665 | Face Box |
| 668 | Combined Face Box |
| 670 | Image |
| 675 | Recognized Face Box |
| 677 | Combined Face Box |
| 680 | Image |
| 681 | Padded Face Box |
| 682 | Padded Face Box |
| 683 | Padded Face Box |
| 684 | Padded Face Box |
| 685 | Padded Face Box |
| 690 | Image |
| 691 | Crop Border |
| 695 | Recognized Padded Face Box |
| 696 | Recognized Padded Face Box |
| 697 | Recognized Combined Padded Face Box |
| 710 | Image |
| 720 | Image |
| 730 | Image |
| 740 | Image |
| 750 | Image |
| 760 | Decision Flow |
| 810 | Image |
| 811 | Face Box |
| 812 | Face Box |
| 815 | Combined Padded Face Box |
| 816 | Expanded Combined Padded Face Box |
| 817 | Constrained Expanded Combined Padded Face Box |
| 825 | Combined Padded Face Box |
| 826 | Expanded Combined Padded Face Box |
| 827 | Constrained Expanded Combined Padded Face Box |
| 910 | Image |
| 911 | Face Box |
| 912 | Face Box |
| 915 | Combined Padded Face Box |
| 916 | Expanded Combined Padded Face Box |
| 920 | Image |
| 921 | Face Box |
| 922 | Face Box |
| 925 | Combined Padded Face Box |
| 926 | Expanded Combined Padded Face Box |

-continued

| | |
|---|---|
| 927 | Original Image Border |
| 930 | Image |
| 931 | Face Box |
| 932 | Face Box |
| 935 | Combined Padded Face Box |
| 936 | Expanded Combined Padded Face Box |
| 940 | Decision Flow |
| 1010 | Image |
| 1011 | Face Box |
| 1012 | Face Box |
| 1013 | Combined Face Box |
| 1015 | Medium Priority Region |
| 1016 | Low Priority Region |
| 1020 | Image |
| 1030 | Image |
| 1040 | Image |
| 1100 | Function |
| 1201 | Image |
| 1211 | Padding |
| 1212 | Face Box |
| 1221 | Padding |
| 1222 | Face Box |
| 1302 | Image |
| 1331 | Padding |
| 1332 | Face |
| 1403 | Image |
| 1441 | Padding |
| 1442 | Face |
| 1503 | Image |
| 1510 | Left Face Box |
| 1520 | Right Face Box |
| 1540 | Combined Padded Face Box |
| 1550 | Symmetric Crop |
| 1710 | Downpadding |
| 1720 | Function |
| 1801 | Image |
| 1821 | Padding |
| 1822 | Face |
| 1825 | Downpadding |
| 1831 | Padding |
| 1832 | Face |
| 1835 | Downpadding |

The invention claimed is:

1. A computing system comprising:
a memory configured to store a first digital image; and
a processing system configured to:
identify two or more individual regions in the first digital image that each include a face;
pad each of the two or more individual regions to produce two or more individual padded regions;
combine at least two of the two or more individual padded regions to form two or more combined padded regions, wherein the at least two of the two or more individual padded regions are each from the first digital image, and wherein the at least two of the two or more combined padded regions are non-overlapping;
automatically evaluate each of the two or more combined padded regions;
ignore at least one combined padded region of the two or more combined padded regions based on the evaluation of the two or more combined padded regions; and
alter the first digital image based on the combined padded region to generate a second digital image based on characteristics of an unignored combined padded region, wherein the second digital image is a recomposed version of the first digital image.

2. The computing system of claim 1, wherein each border of the combined padded region is at least partially collinear with a border of one of the two or more individual padded regions.

3. The computing system of claim 1, wherein the processing system is further configured to automatically alter the first digital image such that the combined padded region satisfies a broad rule of thirds.

4. The computing system of claim 1, wherein the processing system is further configured to automatically alter the first digital image such that the combined padded region satisfies a strict rule of thirds.

5. The computing system of claim 1, wherein the processing system is further configured to automatically alter an aspect ratio of the first digital image such that the combined padded region is preserved without removing any pixels in the combined padded region.

6. The computing system of claim 1, wherein the processing system is further configured to automatically alter an aspect ratio of the first digital image based on a location of the combined padded region.

7. The computing system of claim 1, wherein the processing system is further configured to determine a size of each of the two or more combined padded regions and for excluding at least one of the two or more combined padded regions from the second digital image in response to determining that the size of the at least one of the two or more combined padded regions is smaller than a largest of the two or more combined padded regions by at least a preselected magnitude.

8. The computing system of claim 7, wherein the size of each of the two or more combined padded regions is determined by either an area or a width of each of the two or more combined padded regions.

9. The computing system of claim 1, wherein the processing system is further configured to store, in association with the first digital image, data for identifying the combined padded region.

10. The computing system of claim 1, wherein the processing system is further configured to define the combined padded region by combining only overlapping individual padded regions of the two or more individual padded regions.

11. The computing system of claim 10, wherein an overlap amount of a set of overlapping individual padded regions must be greater than a preselected threshold in order to be defined as a combined padded region.

12. The computing system of claim 1, wherein the processing system is further configured to include multiple highest scoring combined padded regions satisfying a broad rule of thirds.

13. The computing system of claim 12, wherein the processing system is further configured to use a centroid of the multiple highest scoring combined padded regions to satisfy the broad rule of thirds.

14. The computing system of claim 12, wherein the processing system is further configured to use a weighted centroid of the multiple highest scoring combined padded regions to satisfy the broad rule of thirds, and wherein the weighted centroid is defined by a fitness scores of the multiple highest scoring combined padded regions.

15. The computing system of claim 1, wherein the processing system is further configured to:
receive a request for an output aspect ratio for the second digital image; and
ignore one or more lowest scoring combined padded regions at least in part in response to determining that all of the two or more combined padded regions cannot fit the requested output aspect ratio.

16. The computing system of claim 15, wherein the processing system is further configured to automatically detect and issue a notification that a portion of the combined padded region would be deleted if the requested output aspect ratio for the second digital image was executed.

17. The computing system of claim 15, wherein the processing system is further configured to add non-content borders to the first digital image to satisfy the requested output aspect ratio for the second digital image.

18. The computing system of claim 1, wherein the processing system is configured to combine only overlapping individual padded regions of the two or more individual padded regions.

19. The computing system of claim 18, wherein an overlap amount of a set of overlapping individual padded regions must be greater than a preselected threshold in order to be defined as a combined padded region.

20. The computing system of claim 1, wherein all of two or more combined padded regions are non-overlapping.

21. The computing system of claim 1, wherein the two or more combined padded regions comprise low-priority combined padded regions and medium-priority combined padded regions, and wherein none of the medium-priority combined padded regions overlap any other medium-priority combined padded regions.

22. The computing system of claim 1, wherein the processing system is further configured to:
assign a fitness score to each of the two or more combined padded regions; and
ignore at least one combined padded region of the two or more combined padded regions based on the assigned fitness score of the at least one combined padded region being below a preselected threshold.

23. The computing system of claim 1, wherein the processing system is further configured to expand the first digital image based on the combined padded region to generate the second digital image.

24. A method comprising:
storing, by a processing system, a first digital image;
identifying, by a processing system, two or more individual regions in the first digital image that each include a face;
padding, by the processing system, each of the two or more individual regions to produce two or more individual padded regions;
combining, by the processing system, at least two of the two or more individual padded regions to form two or more combined padded regions, wherein the at least two of the two or more individual padded regions are each from the first digital image, and wherein the at least two of the two or more combined padded regions are non-overlapping;
automatically evaluating, by the processing system, each of the two or more combined padded regions;
ignoring, by the processing system, at least one combined padded region of the two or more combined padded regions based on the evaluation of the two or more combined padded regions; and
altering, by the processing system, the first digital image based on the combined padded region to generate a second digital image based on characteristics of an unignored combined padded region, wherein the second digital image is a recomposed version of the first digital image.

25. The method of claim 24, wherein all of the two or more combined padded regions are non-overlapping.

26. The method of claim 24, further comprising:
assigning a fitness score to each of the two or more combined padded regions; and
ignoring at least one combined padded region of the two or more combined padded regions based on the assigned fitness score of the at least one combined padded region being below a preselected threshold.

27. A non-transitory computer-readable medium having instructions stored thereon that, upon execution by a computing device, cause the computing device to perform operations comprising:

storing a first digital image;

identifying two or individual regions in the first digital image that each include a face;

padding each of the two or more individual regions to produce two or more individual padded regions;

combining at least two of the two or more individual padded regions to form two or more, combined padded regions, wherein the at least two of the two or more individual padded regions are each from the first digital image, and wherein the at least two of the two or more combined added regions are non-overlapping;

automatically evaluating each of the two or more combined padded regions;

ignoring at least one combined padded region of the two or more combined padded regions based on the evaluation of the two or more combined padded regions; and altering the first digital image based on the combined padded region to generate a second digital image based on characteristics of an unignored combined padded region, wherein the second digital image is a recomposed version of the first digital image.

28. The computing system of claim 21, wherein the processing system is further configured to determine the fitness score for each of the two or more combined padded regions based on size, blink, gaze direction, expression, pose, occlusion, sharpness, exposure or contrast.

29. The computing system of claim 28, wherein the processing system is further configured to automatically evaluate each of the two or more individual regions including assigning a fitness score to each of the individual regions based on size, blink, gaze direction, expression, pose, occlusion, sharpness, exposure or contrast, and for determining the fitness score for each of the two or more combined padded regions based on a weighted combination of the at least one of the two or more individual regions fitness scores.

* * * * *